(12) United States Patent
Ossig et al.

(10) Patent No.: US 9,684,078 B2
(45) Date of Patent: Jun. 20, 2017

(54) METHOD FOR OPTICALLY SCANNING AND MEASURING AN ENVIRONMENT

(71) Applicant: FARO Technologies, Inc., Lake Mary, FL (US)

(72) Inventors: Martin Ossig, Tamm (DE); Dag Frommhold, Neuffen (DE); Daniel Flohr, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 15/140,909

(22) Filed: Apr. 28, 2016

(65) Prior Publication Data

US 2016/0238710 A1    Aug. 18, 2016

Related U.S. Application Data

(63) Continuation of application No. 13/697,031, filed as application No. PCT/EP2011/001662 on Apr. 1, 2011, now Pat. No. 9,329,271.

(Continued)

(30) Foreign Application Priority Data

May 10, 2010    (DE) .......................... 10 2010 020 952

(51) Int. Cl.
*G01B 11/30*    (2006.01)
*G01S 17/89*    (2006.01)
(Continued)

(52) U.S. Cl.
CPC ................ *G01S 17/89* (2013.01); *G01S 7/51* (2013.01); *G01S 17/42* (2013.01); *G01S 7/4817* (2013.01)

(58) Field of Classification Search
CPC .................................. G01B 11/30; G01V 8/00
(Continued)

(56) References Cited

U.S. PATENT DOCUMENTS

| 1,535,312 A | 4/1925 | Hosking |
| 1,538,758 A | 5/1925 | Taylor |

(Continued)

FOREIGN PATENT DOCUMENTS

| AT | 506110 A1 | 6/2009 |
| AT | 508635 A1 | 3/2011 |

(Continued)

OTHER PUBLICATIONS

First Chinese Office Action for Application No. 201080003467.1; Office Action Issue Date Feb. 5, 2013; (translated).

(Continued)

*Primary Examiner* — Roy M Punnoose
(74) *Attorney, Agent, or Firm* — Cantor Colburn LLP

(57) ABSTRACT

A method, system and computer program product are provided for displaying three-dimensional measurement points on a two-dimensional plane of a display screen having a plurality of pixels. The method includes projecting the measurement points onto the plane. Each of the measurement points is assigned to one of the pixels. A depth value is assigned to each of the pixels. A first pixel is selected having a first measurement point and a first depth value. A first side is searched for a second pixel having a second measurement point and a second depth value. A second side is searched for a third pixel having a third measurement point and a third depth value. It is determined whether the second and third measurement points are on a same plane. The first depth value of the first pixel is changed when the second and third measurement points are on the same plane.

20 Claims, 4 Drawing Sheets

Related U.S. Application Data

(60) Provisional application No. 61/362,810, filed on Jul. 9, 2010.

(51) Int. Cl.
    *G01S 7/51*     (2006.01)
    *G01S 17/42*     (2006.01)
    *G01S 7/481*     (2006.01)

(58) Field of Classification Search
    USPC .................................. 356/601, 607, 608
    See application file for complete search history.

(56) References Cited

U.S. PATENT DOCUMENTS

| | | |
|---|---|---|
| 1,918,813 A | 7/1933 | Kinzy |
| 2,316,573 A | 4/1943 | Egy |
| 2,333,243 A | 11/1943 | Glab |
| 2,702,683 A | 2/1955 | Green et al. |
| 2,748,926 A | 6/1956 | Leahy |
| 2,983,367 A | 6/1958 | Paramater et al. |
| 2,924,495 A | 9/1958 | Haines |
| 2,966,257 A | 12/1960 | Littlejohn |
| 3,066,790 A | 12/1962 | Armbruster |
| 3,458,167 A | 7/1969 | Cooley, Jr. |
| 3,830,567 A | 8/1974 | Riegl |
| 3,899,145 A | 8/1975 | Stephenson |
| 3,945,729 A | 3/1976 | Rosen |
| 4,138,045 A | 2/1979 | Baker |
| 4,178,515 A | 12/1979 | Tarasevich |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,561,776 A | 12/1985 | Pryor |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,667,231 A | 5/1987 | Pryor |
| 4,676,002 A | 6/1987 | Slocum |
| 4,714,339 A | 12/1987 | Lau et al. |
| 4,733,961 A | 3/1988 | Mooney |
| 4,736,218 A | 4/1988 | Kutman |
| 4,751,950 A | 6/1988 | Bock |
| 4,767,257 A | 8/1988 | Kato |
| 4,790,651 A | 12/1988 | Brown et al. |
| 4,816,822 A | 3/1989 | Vache et al. |
| 4,870,274 A | 9/1989 | Hebert et al. |
| 4,882,806 A | 11/1989 | Davis |
| 4,891,509 A | 1/1990 | Jones et al. |
| 4,954,952 A | 9/1990 | Ubhayakar et al. |
| 4,982,841 A | 1/1991 | Goedecke |
| 4,984,881 A | 1/1991 | Osada et al. |
| 4,996,909 A | 3/1991 | Vache et al. |
| 4,999,491 A | 3/1991 | Semler et al. |
| 5,021,641 A | 6/1991 | Swartz et al. |
| 5,025,966 A | 6/1991 | Potter |
| 5,027,951 A | 7/1991 | Johnson |
| 5,068,971 A | 12/1991 | Simon |
| 5,069,524 A | 12/1991 | Watanabe et al. |
| 5,155,684 A | 10/1992 | Burke et al. |
| 5,168,532 A | 12/1992 | Seppi et al. |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,216,479 A | 6/1993 | Dotan et al. |
| 5,218,427 A | 6/1993 | Koch |
| 5,219,423 A | 6/1993 | Kamaya |
| 5,239,855 A | 8/1993 | Schleifer et al. |
| 5,289,264 A | 2/1994 | Steinbichler |
| 5,289,265 A | 2/1994 | Inoue et al. |
| 5,289,855 A | 3/1994 | Baker et al. |
| 5,313,261 A | 5/1994 | Leatham et al. |
| 5,319,445 A | 6/1994 | Fitts |
| 5,329,347 A | 7/1994 | Wallace et al. |
| 5,329,467 A | 7/1994 | Nagamune et al. |
| 5,332,315 A | 7/1994 | Baker et al. |
| 5,337,149 A * | 8/1994 | Kozah ............ G01C 15/002 356/139.03 |
| 5,371,347 A | 12/1994 | Plesko |
| 5,372,250 A | 12/1994 | Johnson |
| 5,373,346 A | 12/1994 | Hocker |
| 5,402,365 A | 3/1995 | Kozikaro et al. |
| 5,402,582 A | 4/1995 | Raab |
| 5,412,880 A | 5/1995 | Raab |
| 5,416,505 A | 5/1995 | Eguchi et al. |
| 5,430,384 A | 7/1995 | Hocker |
| 5,446,846 A | 8/1995 | Lennartsson |
| 5,455,670 A | 10/1995 | Payne et al. |
| 5,455,993 A | 10/1995 | Link et al. |
| 5,510,977 A | 4/1996 | Raab |
| 5,517,297 A | 5/1996 | Stenton |
| 5,528,505 A | 6/1996 | Granger et al. |
| 5,535,524 A | 7/1996 | Carrier et al. |
| 5,563,655 A | 10/1996 | Lathrop |
| 5,611,147 A | 3/1997 | Raab |
| 5,615,489 A | 4/1997 | Breyer et al. |
| 5,623,416 A | 4/1997 | Hocker, III |
| 5,629,756 A | 5/1997 | Kitajima |
| 5,668,631 A | 9/1997 | Norita et al. |
| 5,675,326 A | 10/1997 | Juds et al. |
| 5,677,760 A | 10/1997 | Mikami et al. |
| 5,682,508 A | 10/1997 | Hocker, III |
| 5,716,036 A | 2/1998 | Isobe et al. |
| 5,724,264 A | 3/1998 | Rosenberg et al. |
| 5,734,417 A | 3/1998 | Yamamoto et al. |
| 5,745,225 A | 4/1998 | Watanabe et al. |
| 5,752,112 A | 5/1998 | Paddock et al. |
| 5,754,449 A | 5/1998 | Hoshal et al. |
| 5,768,792 A | 6/1998 | Raab |
| 5,793,993 A | 8/1998 | Broedner et al. |
| 5,804,805 A | 9/1998 | Koenck et al. |
| 5,825,666 A | 10/1998 | Freifeld |
| 5,829,148 A | 11/1998 | Eaton |
| 5,831,719 A | 11/1998 | Berg et al. |
| 5,832,416 A | 11/1998 | Anderson |
| 5,844,591 A | 12/1998 | Takamatsu et al. |
| 5,856,874 A | 1/1999 | Tachibana et al. |
| 5,887,122 A | 3/1999 | Terawaki et al. |
| 5,894,123 A | 4/1999 | Ohtomo et al. |
| 5,898,490 A | 4/1999 | Ohtomo et al. |
| 5,909,939 A | 6/1999 | Fugmann |
| 5,926,782 A | 7/1999 | Raab |
| 5,933,267 A | 8/1999 | Ishizuka |
| 5,936,721 A | 8/1999 | Ohtomo et al. |
| 5,940,170 A | 8/1999 | Berg et al. |
| 5,940,181 A | 8/1999 | Tsubono et al. |
| 5,956,661 A * | 9/1999 | Lefebvre ............ G01C 15/002 356/613 |
| 5,956,857 A | 9/1999 | Raab |
| 5,969,321 A | 10/1999 | Danielson et al. |
| 5,973,788 A | 10/1999 | Pettersen et al. |
| 5,978,748 A | 11/1999 | Raab |
| 5,983,936 A | 11/1999 | Schwieterman et al. |
| 5,988,862 A | 11/1999 | Kacyra et al. |
| 5,991,011 A | 11/1999 | Damm |
| 5,996,790 A | 12/1999 | Yamada et al. |
| 5,997,779 A | 12/1999 | Potter |
| 6,040,898 A | 3/2000 | Mrosik et al. |
| D423,534 S | 4/2000 | Raab et al. |
| 6,050,615 A | 4/2000 | Weinhold |
| 6,060,889 A | 5/2000 | Hocker |
| 6,067,116 A | 5/2000 | Yamano et al. |
| 6,069,700 A | 5/2000 | Rudnick et al. |
| 6,077,306 A | 6/2000 | Metzger et al. |
| 6,112,423 A | 9/2000 | Sheehan |
| 6,125,337 A | 9/2000 | Rosenberg et al. |
| 6,131,299 A | 10/2000 | Raab et al. |
| 6,134,507 A | 10/2000 | Markey, Jr. et al. |

(56) References Cited

U.S. PATENT DOCUMENTS

| | | | |
|---|---|---|---|
| 6,138,915 A | 10/2000 | Danielson et al. | |
| 6,149,112 A | 11/2000 | Thieltges | |
| 6,151,789 A | 11/2000 | Raab et al. | |
| 6,163,294 A | 12/2000 | Talbot | |
| 6,166,504 A | 12/2000 | Iida et al. | |
| 6,166,809 A | 12/2000 | Pettersen et al. | |
| 6,166,811 A | 12/2000 | Long et al. | |
| 6,204,651 B1 | 3/2001 | Marcus et al. | |
| 6,204,961 B1 | 3/2001 | Anderson et al. | |
| 6,219,928 B1 | 4/2001 | Raab et al. | |
| D441,632 S | 5/2001 | Raab et al. | |
| 6,240,651 B1 | 6/2001 | Schroeder et al. | |
| 6,246,468 B1 | 6/2001 | Dimsdale | |
| 6,253,458 B1 | 7/2001 | Raab et al. | |
| 6,282,195 B1 | 8/2001 | Miller et al. | |
| 6,298,569 B1 | 10/2001 | Raab et al. | |
| 6,339,410 B1 | 1/2002 | Milner et al. | |
| 6,349,249 B1 | 2/2002 | Cunningham | |
| 6,366,831 B1 | 4/2002 | Raab | |
| 6,408,252 B1 | 6/2002 | De Smet | |
| 6,418,774 B1 | 7/2002 | Brogaardh et al. | |
| 6,438,856 B1 | 8/2002 | Kaczynski | |
| 6,442,419 B1 | 8/2002 | Chu et al. | |
| 6,445,446 B1 | 9/2002 | Kumagai et al. | |
| 6,460,004 B2 | 10/2002 | Greer et al. | |
| 6,470,584 B1 | 10/2002 | Stoodley | |
| 6,477,784 B2 | 11/2002 | Schroeder et al. | |
| 6,480,270 B1 | 11/2002 | Studnicka et al. | |
| 6,483,106 B1 | 11/2002 | Ohtomo et al. | |
| 6,497,394 B1 | 12/2002 | Dunchock | |
| 6,504,602 B1 | 1/2003 | Hinderling | |
| 6,512,575 B1 | 1/2003 | Marchi | |
| 6,519,860 B1 | 2/2003 | Bieg et al. | |
| D472,824 S | 4/2003 | Raab et al. | |
| 6,542,249 B1 * | 4/2003 | Kofman | G01B 11/2513 356/601 |
| 6,547,397 B1 | 4/2003 | Kaufman et al. | |
| 6,598,306 B2 | 7/2003 | Eaton | |
| 6,611,346 B2 | 8/2003 | Granger | |
| 6,611,617 B1 | 8/2003 | Crampton | |
| D479,544 S | 9/2003 | Raab et al. | |
| 6,612,044 B2 | 9/2003 | Raab et al. | |
| 6,621,065 B1 | 9/2003 | Fukumoto et al. | |
| 6,626,339 B2 | 9/2003 | Gates et al. | |
| 6,633,051 B1 | 10/2003 | Holloway et al. | |
| 6,649,208 B2 | 11/2003 | Rodgers | |
| 6,650,402 B2 | 11/2003 | Sullivan et al. | |
| 6,668,466 B1 | 12/2003 | Bieg et al. | |
| 6,675,122 B1 | 1/2004 | Markendorf et al. | |
| 6,681,495 B2 | 1/2004 | Masayuki et al. | |
| 6,710,859 B2 | 3/2004 | Shirai et al. | |
| D490,831 S | 6/2004 | Raab et al. | |
| D491,210 S | 6/2004 | Raab et al. | |
| 6,750,873 B1 | 6/2004 | Bernardini et al. | |
| 6,764,185 B1 | 7/2004 | Beardsley et al. | |
| 6,789,327 B2 | 9/2004 | Roth et al. | |
| 6,820,346 B2 | 11/2004 | Raab et al. | |
| 6,822,749 B1 | 11/2004 | Christoph | |
| 6,825,923 B2 | 11/2004 | Hamar et al. | |
| 6,826,664 B2 | 11/2004 | Hocker, III et al. | |
| 6,856,381 B2 | 2/2005 | Christoph | |
| 6,858,836 B1 | 2/2005 | Hartrumpf | |
| 6,868,359 B2 | 3/2005 | Raab | |
| 6,879,933 B2 | 4/2005 | Steffey et al. | |
| 6,889,903 B1 | 5/2005 | Koenck | |
| 6,892,465 B2 | 5/2005 | Raab et al. | |
| 6,894,767 B2 | 5/2005 | Ishinabe et al. | |
| 6,895,347 B2 | 5/2005 | Dorny et al. | |
| 6,901,673 B1 | 6/2005 | Cobb et al. | |
| 6,904,691 B2 | 6/2005 | Raab et al. | |
| 6,914,678 B1 | 7/2005 | Ulrichsen et al. | |
| 6,917,415 B2 | 7/2005 | Gogolla et al. | |
| 6,920,697 B2 | 7/2005 | Raab et al. | |
| 6,922,234 B2 * | 7/2005 | Hoffman | G01C 3/08 356/141.1 |
| 6,925,722 B2 | 8/2005 | Raab et al. | |
| 6,931,745 B2 | 8/2005 | Granger | |
| 6,935,036 B2 | 8/2005 | Raab et al. | |
| 6,935,748 B2 | 8/2005 | Kaufman et al. | |
| 6,948,255 B2 | 9/2005 | Russell | |
| 6,957,496 B2 | 10/2005 | Raab et al. | |
| 6,965,843 B2 | 11/2005 | Raab et al. | |
| 6,973,734 B2 | 12/2005 | Raab et al. | |
| 6,988,322 B2 | 1/2006 | Raab et al. | |
| 6,989,890 B2 | 1/2006 | Riegl et al. | |
| 7,003,892 B2 | 2/2006 | Eaton et al. | |
| 7,006,084 B1 | 2/2006 | Buss et al. | |
| 7,024,032 B2 | 4/2006 | Kidd et al. | |
| 7,029,126 B2 | 4/2006 | Tang | |
| 7,032,321 B2 | 4/2006 | Raab et al. | |
| 7,040,136 B2 | 5/2006 | Forss et al. | |
| 7,051,447 B2 | 5/2006 | Kikuchi et al. | |
| 7,069,124 B1 | 6/2006 | Whittaker et al. | |
| 7,069,875 B2 | 7/2006 | Warecki | |
| 7,076,420 B1 | 7/2006 | Snyder et al. | |
| 7,106,421 B2 | 9/2006 | Matsuura et al. | |
| 7,117,107 B2 | 10/2006 | Dorny et al. | |
| 7,120,092 B2 | 10/2006 | del Prado Pavon et al. | |
| 7,127,822 B2 | 10/2006 | Kumagai et al. | |
| 7,140,213 B2 | 11/2006 | Feucht et al. | |
| 7,152,456 B2 | 12/2006 | Eaton | |
| 7,174,651 B2 | 2/2007 | Raab et al. | |
| 7,180,072 B2 | 2/2007 | Persi et al. | |
| 7,184,047 B1 | 2/2007 | Crampton | |
| 7,190,465 B2 | 3/2007 | Froehlich et al. | |
| 7,191,541 B1 | 3/2007 | Weekers et al. | |
| 7,193,690 B2 | 3/2007 | Ossig et al. | |
| 7,196,509 B2 | 3/2007 | Teng | |
| 7,199,872 B2 | 4/2007 | Van Cranenbroeck | |
| 7,200,246 B2 | 4/2007 | Cofer et al. | |
| 7,202,941 B2 | 4/2007 | Munro | |
| 7,230,689 B2 | 6/2007 | Lau | |
| 7,242,590 B1 | 7/2007 | Yeap et al. | |
| 7,246,030 B2 | 7/2007 | Raab et al. | |
| 7,249,421 B2 | 7/2007 | MacManus et al. | |
| 7,256,899 B1 | 8/2007 | Faul et al. | |
| 7,269,910 B2 | 9/2007 | Raab et al. | |
| D551,943 S | 10/2007 | Hodjat et al. | |
| 7,285,793 B2 | 10/2007 | Husted | |
| 7,296,364 B2 | 11/2007 | Seitz et al. | |
| 7,296,955 B2 | 11/2007 | Dreier | |
| 7,296,979 B2 | 11/2007 | Raab et al. | |
| 7,306,339 B2 | 12/2007 | Kaufman et al. | |
| 7,307,701 B2 | 12/2007 | Hoffman, II | |
| 7,312,862 B2 | 12/2007 | Zumbrunn et al. | |
| 7,313,264 B2 | 12/2007 | Crampton | |
| D559,657 S | 1/2008 | Wohlford et al. | |
| 7,319,512 B2 | 1/2008 | Ohtomo et al. | |
| 7,337,344 B2 | 2/2008 | Barman et al. | |
| 7,342,650 B2 | 3/2008 | Kern et al. | |
| 7,348,822 B2 | 3/2008 | Baer | |
| 7,352,446 B2 | 4/2008 | Bridges et al. | |
| 7,360,648 B1 | 4/2008 | Blaschke | |
| 7,372,558 B2 | 5/2008 | Kaufman et al. | |
| 7,372,581 B2 | 5/2008 | Raab et al. | |
| 7,383,638 B2 | 6/2008 | Granger | |
| 7,388,654 B2 | 6/2008 | Raab et al. | |
| 7,389,870 B2 | 6/2008 | Slappay | |
| 7,395,606 B2 | 7/2008 | Crampton | |
| 7,400,384 B1 | 7/2008 | Evans et al. | |
| 7,403,268 B2 * | 7/2008 | England | G01C 15/002 356/4.01 |
| 7,403,269 B2 | 7/2008 | Yamashita et al. | |
| 7,430,068 B2 | 9/2008 | Becker et al. | |
| 7,441,341 B2 | 10/2008 | Eaton | |
| 7,443,555 B2 | 10/2008 | Blug et al. | |
| 7,447,931 B1 | 11/2008 | Rischar et al. | |
| 7,449,876 B2 | 11/2008 | Pleasant et al. | |
| 7,454,265 B2 | 11/2008 | Marsh | |
| 7,463,368 B2 | 12/2008 | Morden et al. | |
| 7,477,359 B2 * | 1/2009 | England | G01S 7/51 356/4.01 |
| 7,477,360 B2 * | 1/2009 | England | G06T 11/60 356/4.01 |

(56) References Cited

U.S. PATENT DOCUMENTS

| | | | |
|---|---|---|---|
| 7,480,037 B2 | 1/2009 | Palmateer et al. | |
| 7,508,971 B2 | 3/2009 | Vaccaro et al. | |
| 7,515,256 B2 | 4/2009 | Ohtomo et al. | |
| 7,525,276 B2 | 4/2009 | Eaton | |
| 7,541,830 B2 | 6/2009 | Fahrbach et al. | |
| 7,545,517 B2 | 6/2009 | Rueb et al. | |
| 7,546,689 B2 | 6/2009 | Ferrari et al. | |
| 7,551,771 B2 * | 6/2009 | England, III | G01C 3/08 382/154 |
| 7,552,644 B2 | 6/2009 | Haase et al. | |
| 7,557,824 B2 | 7/2009 | Holliman | |
| 7,561,598 B2 | 7/2009 | Stratton et al. | |
| 7,564,250 B2 | 7/2009 | Hocker | |
| 7,568,293 B2 | 8/2009 | Ferrari | |
| 7,578,069 B2 | 8/2009 | Eaton | |
| D599,226 S | 9/2009 | Gerent et al. | |
| 7,589,595 B2 | 9/2009 | Cutler | |
| 7,591,077 B2 | 9/2009 | Pettersson | |
| 7,591,078 B2 | 9/2009 | Crampton | |
| 7,600,061 B2 | 10/2009 | Honda | |
| 7,602,873 B2 | 10/2009 | Eidson | |
| 7,604,207 B2 | 10/2009 | Hasloecher et al. | |
| 7,610,175 B2 | 10/2009 | Eidson | |
| 7,614,157 B2 | 11/2009 | Granger | |
| 7,624,510 B2 | 12/2009 | Ferrari | |
| 7,625,335 B2 | 12/2009 | Deichmann et al. | |
| 7,626,690 B2 | 12/2009 | Kumagai et al. | |
| D607,350 S | 1/2010 | Cooduvalli et al. | |
| 7,656,751 B2 | 2/2010 | Rischar et al. | |
| 7,659,995 B2 | 2/2010 | Knighton et al. | |
| D610,926 S | 3/2010 | Gerent et al. | |
| 7,693,325 B2 | 4/2010 | Pulla et al. | |
| 7,697,748 B2 | 4/2010 | Dimsdale et al. | |
| 7,701,592 B2 | 4/2010 | Saint Clair et al. | |
| 7,712,224 B2 | 5/2010 | Hicks | |
| 7,721,396 B2 | 5/2010 | Fleischman | |
| 7,728,963 B2 | 6/2010 | Kirschner | |
| 7,733,544 B2 | 6/2010 | Becker et al. | |
| 7,735,234 B2 | 6/2010 | Briggs et al. | |
| 7,743,524 B2 | 6/2010 | Eaton et al. | |
| 7,752,003 B2 | 7/2010 | MacManus | |
| 7,765,707 B2 | 8/2010 | Tomelleri | |
| 7,769,559 B2 | 8/2010 | Reichert | |
| 7,774,949 B2 | 8/2010 | Ferrari | |
| 7,777,761 B2 * | 8/2010 | England | G01S 17/89 345/619 |
| 7,779,548 B2 | 8/2010 | Ferrari | |
| 7,779,553 B2 | 8/2010 | Jordil et al. | |
| 7,784,194 B2 | 8/2010 | Raab et al. | |
| 7,787,670 B2 | 8/2010 | Urushiya | |
| 7,793,425 B2 | 9/2010 | Bailey | |
| 7,798,453 B2 | 9/2010 | Maningo et al. | |
| 7,800,758 B1 | 9/2010 | Bridges et al. | |
| 7,804,602 B2 | 9/2010 | Raab | |
| 7,805,851 B2 | 10/2010 | Pettersson | |
| 7,805,854 B2 | 10/2010 | Eaton | |
| 7,809,518 B2 | 10/2010 | Zhu et al. | |
| 7,834,985 B2 | 11/2010 | Morcom | |
| 7,847,922 B2 * | 12/2010 | Gittinger | F41J 5/00 356/141.5 |
| RE42,055 E | 1/2011 | Raab | |
| 7,869,005 B2 | 1/2011 | Ossig et al. | |
| RE42,082 E | 2/2011 | Raab et al. | |
| 7,881,896 B2 | 2/2011 | Atwell et al. | |
| 7,891,248 B2 | 2/2011 | Hough et al. | |
| 7,900,714 B2 | 3/2011 | Milbourne et al. | |
| 7,903,261 B2 | 3/2011 | Saint Clair et al. | |
| 7,908,757 B2 | 3/2011 | Ferrari | |
| 7,933,055 B2 | 4/2011 | Jensen et al. | |
| 7,935,928 B2 | 5/2011 | Serger et al. | |
| 7,982,866 B2 | 7/2011 | Vogel | |
| D643,319 S | 8/2011 | Ferrari et al. | |
| 7,994,465 B1 | 8/2011 | Bamji et al. | |
| 7,995,834 B1 | 8/2011 | Knighton et al. | |
| 8,001,697 B2 | 8/2011 | Danielson et al. | |
| 8,020,657 B2 | 9/2011 | Allard et al. | |
| 8,028,432 B2 | 10/2011 | Bailey et al. | |
| 8,052,857 B2 | 11/2011 | Townsend | |
| 8,065,861 B2 | 11/2011 | Caputo | |
| 8,082,673 B2 | 12/2011 | Desforges et al. | |
| 8,099,877 B2 | 1/2012 | Champ | |
| 8,117,668 B2 | 2/2012 | Crampton et al. | |
| 8,123,350 B2 | 2/2012 | Cannell et al. | |
| 8,152,071 B2 | 4/2012 | Doherty et al. | |
| D659,035 S | 5/2012 | Ferrari et al. | |
| 8,171,650 B2 | 5/2012 | York et al. | |
| D662,427 S | 6/2012 | Bailey et al. | |
| 8,218,131 B2 | 7/2012 | Otani et al. | |
| 8,269,984 B2 | 9/2012 | Hinderling et al. | |
| 8,276,286 B2 | 10/2012 | Bailey et al. | |
| 8,284,407 B2 | 10/2012 | Briggs et al. | |
| 8,310,653 B2 | 11/2012 | Ogawa et al. | |
| 8,346,392 B2 | 1/2013 | Walser et al. | |
| 8,352,212 B2 | 1/2013 | Fetter et al. | |
| 8,353,059 B2 | 1/2013 | Crampton et al. | |
| D676,341 S | 2/2013 | Bailey et al. | |
| 8,384,914 B2 * | 2/2013 | Becker | G01C 15/002 356/141.5 |
| D678,085 S | 3/2013 | Bailey et al. | |
| 8,391,565 B2 | 3/2013 | Purcell et al. | |
| 8,402,669 B2 | 3/2013 | Ferrari et al. | |
| 8,497,901 B2 | 7/2013 | Pettersson | |
| 8,533,967 B2 | 9/2013 | Bailey et al. | |
| 8,537,374 B2 | 9/2013 | Briggs et al. | |
| 8,619,265 B2 | 12/2013 | Steffey et al. | |
| 8,659,748 B2 | 2/2014 | Dakin et al. | |
| 8,659,752 B2 | 2/2014 | Cramer et al. | |
| 8,661,700 B2 | 3/2014 | Briggs et al. | |
| 8,677,643 B2 | 3/2014 | Bridges et al. | |
| 8,683,709 B2 | 4/2014 | York | |
| 8,699,007 B2 | 4/2014 | Becker et al. | |
| 8,705,012 B2 | 4/2014 | Greiner et al. | |
| 8,705,016 B2 | 4/2014 | Schumann et al. | |
| 8,718,837 B2 | 5/2014 | Wang et al. | |
| 8,784,425 B2 | 7/2014 | Ritchey et al. | |
| 8,797,552 B2 | 8/2014 | Suzuki et al. | |
| 8,811,767 B2 | 8/2014 | Veeraraghavan et al. | |
| 8,830,485 B2 | 9/2014 | Woloschyn | |
| 9,113,023 B2 | 8/2015 | Bridges et al. | |
| 9,279,662 B2 | 3/2016 | Steffey et al. | |
| 9,372,265 B2 | 6/2016 | Zweigle et al. | |
| 9,383,587 B2 | 7/2016 | Balogh | |
| 2001/0004269 A1 | 6/2001 | Shibata et al. | |
| 2002/0015934 A1 | 2/2002 | Rubbert et al. | |
| 2002/0032541 A1 | 3/2002 | Raab et al. | |
| 2002/0059042 A1 | 5/2002 | Kacyra et al. | |
| 2002/0087233 A1 | 7/2002 | Raab | |
| 2002/0128790 A1 | 9/2002 | Woodmansee | |
| 2002/0143506 A1 | 10/2002 | D'Aligny et al. | |
| 2002/0149694 A1 | 10/2002 | Seo | |
| 2002/0170192 A1 | 11/2002 | Steffey et al. | |
| 2002/0176097 A1 | 11/2002 | Rodgers | |
| 2003/0002055 A1 | 1/2003 | Kilthau et al. | |
| 2003/0033104 A1 | 2/2003 | Gooche | |
| 2003/0043386 A1 | 3/2003 | Froehlich et al. | |
| 2003/0053037 A1 | 3/2003 | Blaesing-Bangert et al. | |
| 2003/0066923 A1 | 4/2003 | Hipp | |
| 2003/0090646 A1 | 5/2003 | Riegl et al. | |
| 2003/0125901 A1 | 7/2003 | Steffey et al. | |
| 2003/0137449 A1 | 7/2003 | Vashisth et al. | |
| 2003/0142631 A1 | 7/2003 | Silvester | |
| 2003/0167647 A1 | 9/2003 | Raab et al. | |
| 2003/0172536 A1 | 9/2003 | Raab et al. | |
| 2003/0172537 A1 | 9/2003 | Raab et al. | |
| 2003/0179361 A1 | 9/2003 | Ohtomo et al. | |
| 2003/0208919 A1 | 11/2003 | Raab et al. | |
| 2003/0221326 A1 | 12/2003 | Raab et al. | |
| 2004/0004727 A1 | 1/2004 | Yanagisawa et al. | |
| 2004/0022416 A1 | 2/2004 | Lemelson et al. | |
| 2004/0027554 A1 | 2/2004 | Ishinabe et al. | |
| 2004/0040166 A1 | 3/2004 | Raab et al. | |
| 2004/0103547 A1 | 6/2004 | Raab et al. | |
| 2004/0111908 A1 | 6/2004 | Raab et al. | |
| 2004/0119020 A1 | 6/2004 | Bodkin | |

(56) References Cited

U.S. PATENT DOCUMENTS

| | | |
|---|---|---|
| 2004/0135990 A1 | 7/2004 | Ohtomo et al. |
| 2004/0139265 A1 | 7/2004 | Hocker, III et al. |
| 2004/0158355 A1 | 8/2004 | Holmqvist et al. |
| 2004/0162700 A1 | 8/2004 | Rosenberg et al. |
| 2004/0179570 A1 | 9/2004 | Vitruk et al. |
| 2004/0221790 A1 | 11/2004 | Sinclair et al. |
| 2004/0246462 A1 | 12/2004 | Kaneko et al. |
| 2004/0246589 A1 | 12/2004 | Kim et al. |
| 2004/0259533 A1 | 12/2004 | Nixon et al. |
| 2005/0016008 A1 | 1/2005 | Raab et al. |
| 2005/0024625 A1 | 2/2005 | Mori et al. |
| 2005/0028393 A1 | 2/2005 | Raab et al. |
| 2005/0046823 A1 | 3/2005 | Ando et al. |
| 2005/0058332 A1 | 3/2005 | Kaufman et al. |
| 2005/0082262 A1 | 4/2005 | Rueb et al. |
| 2005/0085940 A1 | 4/2005 | Griggs et al. |
| 2005/0111514 A1 | 5/2005 | Matsumoto et al. |
| 2005/0141052 A1* | 6/2005 | Becker .................. G02B 26/10 358/475 |
| 2005/0144799 A1 | 7/2005 | Raab et al. |
| 2005/0150123 A1 | 7/2005 | Eaton |
| 2005/0151963 A1 | 7/2005 | Pulla et al. |
| 2005/0166413 A1 | 8/2005 | Crampton |
| 2005/0172503 A1 | 8/2005 | Kumagai et al. |
| 2005/0188557 A1 | 9/2005 | Raab et al. |
| 2005/0190384 A1 | 9/2005 | Persi et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0061566 A1 | 3/2006 | Verma et al. |
| 2006/0066836 A1 | 3/2006 | Bridges et al. |
| 2006/0088044 A1 | 4/2006 | Hammerl |
| 2006/0096108 A1 | 5/2006 | Raab et al. |
| 2006/0103853 A1 | 5/2006 | Palmateer |
| 2006/0109536 A1 | 5/2006 | Mettenleiter et al. |
| 2006/0123649 A1 | 6/2006 | Muller |
| 2006/0129349 A1 | 6/2006 | Raab et al. |
| 2006/0132803 A1 | 6/2006 | Clair et al. |
| 2006/0145703 A1 | 7/2006 | Steinbichler et al. |
| 2006/0169050 A1 | 8/2006 | Kobayashi et al. |
| 2006/0169608 A1 | 8/2006 | Carnevali et al. |
| 2006/0170870 A1 | 8/2006 | Kaufman et al. |
| 2006/0182314 A1 | 8/2006 | England et al. |
| 2006/0186301 A1 | 8/2006 | Dozier et al. |
| 2006/0193521 A1 | 8/2006 | England, III et al. |
| 2006/0241791 A1 | 10/2006 | Pokorny et al. |
| 2006/0244746 A1 | 11/2006 | England et al. |
| 2006/0245717 A1 | 11/2006 | Ossig et al. |
| 2006/0279246 A1 | 12/2006 | Hashimoto et al. |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058154 A1 | 3/2007 | Reichert et al. |
| 2007/0058162 A1 | 3/2007 | Granger |
| 2007/0064976 A1 | 3/2007 | England, III |
| 2007/0097381 A1 | 5/2007 | Tobiason et al. |
| 2007/0097382 A1 | 5/2007 | Granger |
| 2007/0100498 A1 | 5/2007 | Matsumoto et al. |
| 2007/0105238 A1 | 5/2007 | Mandl et al. |
| 2007/0118269 A1 | 5/2007 | Gibson et al. |
| 2007/0122250 A1 | 5/2007 | Mullner |
| 2007/0142970 A1 | 6/2007 | Burbank et al. |
| 2007/0147265 A1 | 6/2007 | Eidson et al. |
| 2007/0147435 A1 | 6/2007 | Hamilton et al. |
| 2007/0147562 A1 | 6/2007 | Eidson |
| 2007/0150111 A1 | 6/2007 | Wu et al. |
| 2007/0151390 A1 | 7/2007 | Blumenkranz et al. |
| 2007/0153297 A1 | 7/2007 | Lau |
| 2007/0163134 A1 | 7/2007 | Eaton |
| 2007/0163136 A1 | 7/2007 | Eaton et al. |
| 2007/0171220 A1 | 7/2007 | Kriveshko |
| 2007/0171394 A1 | 7/2007 | Steiner et al. |
| 2007/0172112 A1 | 7/2007 | Paley et al. |
| 2007/0176648 A1 | 8/2007 | Baer |
| 2007/0177016 A1 | 8/2007 | Wu |
| 2007/0181685 A1 | 8/2007 | Zhu et al. |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0229801 A1 | 10/2007 | Tearney et al. |
| 2007/0229929 A1 | 10/2007 | Soreide et al. |
| 2007/0247615 A1 | 10/2007 | Bridges et al. |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052808 A1 | 3/2008 | Leick et al. |
| 2008/0052936 A1 | 3/2008 | Briggs et al. |
| 2008/0066583 A1 | 3/2008 | Lott et al. |
| 2008/0068103 A1 | 3/2008 | Cutler |
| 2008/0075325 A1 | 3/2008 | Otani et al. |
| 2008/0075326 A1 | 3/2008 | Otani et al. |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0218728 A1 | 9/2008 | Kirschner |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0273758 A1 | 11/2008 | Fuchs et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0302200 A1 | 12/2008 | Tobey |
| 2008/0309460 A1 | 12/2008 | Jefferson et al. |
| 2008/0309546 A1 | 12/2008 | Wakayama et al. |
| 2009/0000136 A1 | 1/2009 | Crampton |
| 2009/0010740 A1 | 1/2009 | Ferrari et al. |
| 2009/0013548 A1 | 1/2009 | Ferrari |
| 2009/0016475 A1 | 1/2009 | Rischar et al. |
| 2009/0021351 A1 | 1/2009 | Beniyama et al. |
| 2009/0031575 A1 | 2/2009 | Tomelleri |
| 2009/0046140 A1 | 2/2009 | Lashmet et al. |
| 2009/0046752 A1 | 2/2009 | Bueche et al. |
| 2009/0046895 A1 | 2/2009 | Pettersson et al. |
| 2009/0049704 A1 | 2/2009 | Styles et al. |
| 2009/0051938 A1 | 2/2009 | Miousset et al. |
| 2009/0083985 A1 | 4/2009 | Ferrari |
| 2009/0089004 A1 | 4/2009 | Vook et al. |
| 2009/0089078 A1 | 4/2009 | Bursey |

(56) References Cited

U.S. PATENT DOCUMENTS

| | | |
|---|---|---|
| 2009/0089233 A1 | 4/2009 | Gach et al. |
| 2009/0089623 A1 | 4/2009 | Neering et al. |
| 2009/0095047 A1 | 4/2009 | Patel et al. |
| 2009/0100949 A1 | 4/2009 | Shirai et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0133276 A1 | 5/2009 | Bailey et al. |
| 2009/0133494 A1 | 5/2009 | Van Dam et al. |
| 2009/0139105 A1 | 6/2009 | Granger |
| 2009/0157419 A1 | 6/2009 | Bursey |
| 2009/0161091 A1 | 6/2009 | Yamamoto |
| 2009/0165317 A1 | 7/2009 | Little |
| 2009/0177435 A1 | 7/2009 | Heininen |
| 2009/0177438 A1 | 7/2009 | Raab |
| 2009/0185741 A1 | 7/2009 | Nahari et al. |
| 2009/0187373 A1 | 7/2009 | Atwell |
| 2009/0241360 A1 | 10/2009 | Tait et al. |
| 2009/0249634 A1 | 10/2009 | Pettersson |
| 2009/0265946 A1 | 10/2009 | Jordil et al. |
| 2009/0273771 A1 | 11/2009 | Gittinger et al. |
| 2009/0299689 A1 | 12/2009 | Stubben et al. |
| 2009/0322859 A1 | 12/2009 | Shelton et al. |
| 2009/0323742 A1 | 12/2009 | Kumano |
| 2010/0030421 A1 | 2/2010 | Yoshimura et al. |
| 2010/0040742 A1 | 2/2010 | Dijkhuis et al. |
| 2010/0049891 A1 | 2/2010 | Hartwich et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0134596 A1 | 6/2010 | Becker |
| 2010/0134598 A1 | 6/2010 | St-Pierre et al. |
| 2010/0134599 A1 | 6/2010 | Billert et al. |
| 2010/0135534 A1 | 6/2010 | Weston et al. |
| 2010/0148013 A1 | 6/2010 | Bhotika et al. |
| 2010/0188504 A1 | 7/2010 | Dimsdale et al. |
| 2010/0195086 A1* | 8/2010 | Ossig ............... G01S 7/491 356/5.01 |
| 2010/0207938 A1 | 8/2010 | Yau et al. |
| 2010/0208062 A1 | 8/2010 | Pettersson |
| 2010/0208318 A1 | 8/2010 | Jensen et al. |
| 2010/0245851 A1 | 9/2010 | Teodorescu |
| 2010/0277472 A1 | 11/2010 | Kaltenbach et al. |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0321152 A1 | 12/2010 | Argudyaev et al. |
| 2010/0325907 A1 | 12/2010 | Tait |
| 2011/0000095 A1 | 1/2011 | Carlson |
| 2011/0001958 A1 | 1/2011 | Bridges et al. |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0025905 A1 | 2/2011 | Tanaka |
| 2011/0043515 A1 | 2/2011 | Stathis |
| 2011/0066781 A1 | 3/2011 | Debelak et al. |
| 2011/0094908 A1 | 4/2011 | Trieu et al. |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0119025 A1 | 5/2011 | Fetter et al. |
| 2011/0123097 A1 | 5/2011 | Van Coppenolle |
| 2011/0164114 A1 | 7/2011 | Kobayashi et al. |
| 2011/0166824 A1 | 7/2011 | Haisty et al. |
| 2011/0169924 A1 | 7/2011 | Haisty et al. |
| 2011/0173823 A1 | 7/2011 | Bailey et al. |
| 2011/0173827 A1 | 7/2011 | Bailey et al. |
| 2011/0173828 A1 | 7/2011 | York |
| 2011/0178755 A1 | 7/2011 | York |
| 2011/0178758 A1 | 7/2011 | Atwell et al. |
| 2011/0178762 A1 | 7/2011 | York |
| 2011/0178764 A1 | 7/2011 | York |
| 2011/0178765 A1 | 7/2011 | Atwell et al. |
| 2011/0188739 A1 | 8/2011 | Lee et al. |
| 2011/0192043 A1 | 8/2011 | Ferrari et al. |
| 2011/0273568 A1 | 11/2011 | Lagassey et al. |
| 2011/0282622 A1 | 11/2011 | Canter et al. |
| 2011/0288684 A1 | 11/2011 | Farlow et al. |
| 2012/0035788 A1 | 2/2012 | Trepagnier et al. |
| 2012/0035798 A1 | 2/2012 | Barfoot et al. |
| 2012/0044476 A1 | 2/2012 | Earhart et al. |
| 2012/0046820 A1 | 2/2012 | Allard et al. |
| 2012/0069325 A1 | 3/2012 | Schumann et al. |
| 2012/0069352 A1 | 3/2012 | Ossig et al. |
| 2012/0070077 A1 | 3/2012 | Ossig et al. |
| 2012/0113913 A1 | 5/2012 | Tiirola et al. |
| 2012/0133953 A1* | 5/2012 | Ossig ............... G01S 7/497 356/601 |
| 2012/0140244 A1 | 6/2012 | Gittinger et al. |
| 2012/0154786 A1 | 6/2012 | Gosch et al. |
| 2012/0155744 A1 | 6/2012 | Kennedy et al. |
| 2012/0169876 A1 | 7/2012 | Reichert et al. |
| 2012/0181194 A1 | 7/2012 | Mcewan et al. |
| 2012/0210678 A1 | 8/2012 | Alcouloumre et al. |
| 2012/0217357 A1 | 8/2012 | Franke |
| 2012/0229788 A1 | 9/2012 | Schumann et al. |
| 2012/0260512 A1 | 10/2012 | Kretschmer et al. |
| 2012/0260611 A1 | 10/2012 | Jones |
| 2012/0262700 A1 | 10/2012 | Schumann et al. |
| 2013/0010307 A1 | 1/2013 | Greiner et al. |
| 2013/0025143 A1 | 1/2013 | Bailey et al. |
| 2013/0025144 A1 | 1/2013 | Briggs et al. |
| 2013/0027515 A1 | 1/2013 | Vinther et al. |
| 2013/0062243 A1 | 3/2013 | Chang et al. |
| 2013/0070250 A1 | 3/2013 | Ditte et al. |
| 2013/0094024 A1 | 4/2013 | Ruhland et al. |
| 2013/0097882 A1 | 4/2013 | Bridges et al. |
| 2013/0125408 A1 | 5/2013 | Atwell et al. |
| 2013/0162472 A1 | 6/2013 | Najim et al. |
| 2013/0201487 A1 | 8/2013 | Ossig et al. |
| 2013/0205606 A1 | 8/2013 | Briggs et al. |
| 2013/0212889 A9 | 8/2013 | Bridges et al. |
| 2013/0218024 A1 | 8/2013 | Boctor et al. |
| 2013/0222816 A1 | 8/2013 | Briggs et al. |
| 2013/0300740 A1 | 11/2013 | Snyder et al. |
| 2014/0002608 A1 | 1/2014 | Atwell et al. |
| 2014/0015963 A1 | 1/2014 | Klaas |
| 2014/0028805 A1 | 1/2014 | Tohme |
| 2014/0049784 A1 | 2/2014 | Woloschyn |
| 2014/0063489 A1 | 3/2014 | Steffey et al. |
| 2014/0120493 A1 | 5/2014 | Levin |
| 2014/0226190 A1 | 8/2014 | Bridges et al. |
| 2014/0240690 A1 | 8/2014 | Newman et al. |
| 2014/0267623 A1 | 9/2014 | Bridges et al. |
| 2014/0268108 A1 | 9/2014 | Grau |
| 2014/0362424 A1 | 12/2014 | Bridges et al. |
| 2015/0015701 A1 | 1/2015 | Yu |
| 2015/0109419 A1 | 4/2015 | Vollrath et al. |
| 2015/0160347 A1 | 6/2015 | Zweigle et al. |
| 2015/0229907 A1 | 8/2015 | Bridges |
| 2015/0241204 A1 | 8/2015 | Steffey et al. |
| 2015/0369917 A1 | 12/2015 | Bridges et al. |
| 2015/0373321 A1 | 12/2015 | Bridges |
| 2015/0378023 A1 | 12/2015 | Royo Royo et al. |
| 2016/0033643 A1 | 2/2016 | Zweigle et al. |
| 2016/0047914 A1 | 2/2016 | Zweigle et al. |
| 2016/0069670 A1 | 3/2016 | Ruhland et al. |

(56) References Cited

U.S. PATENT DOCUMENTS

| | | | |
|---|---|---|---|
| 2016/0073085 A1 | 3/2016 | Hillebrand et al. | |
| 2016/0073091 A1 | 3/2016 | Hillebrand et al. | |
| 2016/0073104 A1 | 3/2016 | Hillebrand et al. | |

FOREIGN PATENT DOCUMENTS

| | | |
|---|---|---|
| AU | 2005200937 A1 | 9/2006 |
| CN | 2236119 y | 9/1996 |
| CN | 1133969 A | 10/1996 |
| CN | 2508896 Y | 9/2002 |
| CN | 2665668 Y | 12/2004 |
| CN | 1630804 A | 6/2005 |
| CN | 1630805 A | 6/2005 |
| CN | 1735789 | 2/2006 |
| CN | 1812868 A | 8/2006 |
| CN | 1818537 A | 8/2006 |
| CN | 1838102 A | 9/2006 |
| CN | 1839293 A | 9/2006 |
| CN | 1853084 A | 10/2006 |
| CN | 101024286 A | 8/2007 |
| CN | 101156043 A | 4/2008 |
| CN | 101163939 A | 4/2008 |
| CN | 101371099 A | 2/2009 |
| CN | 201266071 Y | 7/2009 |
| CN | 101511529 A | 8/2009 |
| DE | 2216765 A1 | 4/1972 |
| DE | 2950138 A1 | 6/1981 |
| DE | 3227980 A1 | 5/1983 |
| DE | 3245060 A1 | 7/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 4410775 A1 | 10/1995 |
| DE | 4412044 | 10/1995 |
| DE | 29622033 | 2/1997 |
| DE | 19543763 A1 | 5/1997 |
| DE | 19601875 A1 | 7/1997 |
| DE | 19607345 A1 | 8/1997 |
| DE | 19720049 A1 | 11/1998 |
| DE | 19811550 A1 | 9/1999 |
| DE | 19820307 A1 | 11/1999 |
| DE | 19850118 A1 | 5/2000 |
| DE | 19928958 A1 | 11/2000 |
| DE | 10026357 A1 | 1/2002 |
| DE | 20208077 U1 | 5/2002 |
| DE | 10137241 A1 | 9/2002 |
| DE | 10149750 A1 | 9/2002 |
| DE | 10155488 | 5/2003 |
| DE | 10155488 A1 | 5/2003 |
| DE | 10219054 A1 | 11/2003 |
| DE | 10232028 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10313223 A1 | 10/2004 |
| DE | 10326848 | 1/2005 |
| DE | 202005000983 U1 | 3/2005 |
| DE | 10361870 A | 7/2005 |
| DE | 102004015668 B3 | 9/2005 |
| DE | 102004015111 A1 | 10/2005 |
| DE | 102004028090 A1 | 12/2005 |
| DE | 10114126 B4 | 8/2006 |
| DE | 202006005643 U1 | 8/2006 |
| DE | 102004010083 B4 | 11/2006 |
| DE | 102005043931 A1 | 3/2007 |
| DE | 102005056265 A1 | 5/2007 |
| DE | 102006053611 A1 | 5/2007 |
| DE | 102005060967 A1 | 6/2007 |
| DE | 102006023902 | 11/2007 |
| DE | 102006024534 A1 | 11/2007 |
| DE | 102006035292 A1 | 1/2008 |
| DE | 202006020299 U1 | 5/2008 |
| DE | 102007037162 A1 | 2/2009 |
| DE | 102008014274 A1 | 8/2009 |
| DE | 102009055988 | 11/2009 |
| DE | 102008039838 A1 | 3/2010 |
| DE | 102005036929 B4 | 6/2010 |
| DE | 102008062763 B3 | 7/2010 |
| DE | 102009001894 A1 | 9/2010 |
| DE | 102009035336 B3 | 11/2010 |
| DE | 202010005042 U1 | 8/2011 |
| DE | 102010032723 B3 | 11/2011 |
| DE | 102010032726 B3 | 11/2011 |
| DE | 102010033561 B3 | 12/2011 |
| DE | 102010032725 A1 | 1/2012 |
| DE | 202011051975 U1 | 2/2013 |
| DE | 102012107544 B3 | 5/2013 |
| DE | 102012112322 A1 | 6/2014 |
| EP | 0546784 A2 | 6/1993 |
| EP | 0667549 A2 | 8/1995 |
| EP | 0727642 A1 | 8/1996 |
| EP | 0730210 A1 | 9/1996 |
| EP | 0614517 | 3/1997 |
| EP | 0838696 A1 | 4/1998 |
| EP | 0949524 A1 | 10/1999 |
| EP | 1056987 A1 | 6/2000 |
| EP | 1160539 | 12/2001 |
| EP | 1189124 A1 | 3/2002 |
| EP | 0767357 B1 | 5/2002 |
| EP | 1310764 A2 | 5/2003 |
| EP | 1342989 A2 | 9/2003 |
| EP | 1347267 A1 | 9/2003 |
| EP | 1361414 A1 | 11/2003 |
| EP | 1452279 | 9/2004 |
| EP | 1468791 A1 | 10/2004 |
| EP | 1528410 A1 | 5/2005 |
| EP | 1669713 A1 | 6/2006 |
| EP | 1734425 | 12/2006 |
| EP | 1429109 | 4/2007 |
| EP | 1764579 | 12/2007 |
| EP | 1878543 A2 | 1/2008 |
| EP | 1882895 A1 | 1/2008 |
| EP | 1967930 A2 | 9/2008 |
| EP | 2003419 A1 | 12/2008 |
| EP | 2023077 A1 | 2/2009 |
| EP | 2042905 A1 | 4/2009 |
| EP | 2060530 A1 | 5/2009 |
| EP | 2068067 A1 | 6/2009 |
| EP | 2068114 | 6/2009 |
| EP | 2108917 A1 | 10/2009 |
| EP | 2177868 A2 | 4/2010 |
| EP | 2259013 A1 | 12/2010 |
| EP | 2400261 A1 | 12/2011 |
| EP | 2428764 A1 | 3/2012 |
| EP | 2693300 A2 | 2/2014 |
| EP | 2728306 A1 | 5/2014 |
| FR | 2603228 A1 | 3/1988 |
| FR | 2935043 A1 | 2/2010 |
| GB | 894320 | 4/1962 |
| GB | 1112941 | 5/1968 |
| GB | 2222695 A | 3/1990 |
| GB | 2255648 A | 11/1992 |
| GB | 2336493 A | 10/1999 |
| GB | 2341203 A | 3/2000 |
| GB | 2388661 A | 11/2003 |
| GB | 2420241 A | 5/2006 |
| GB | 2447258 A | 9/2008 |
| GB | 2452033 A | 2/2009 |
| JP | 5581525 | 6/1955 |
| JP | 575584 A | 1/1982 |
| JP | 58171291 | 1/1983 |
| JP | 5827264 | 2/1983 |
| JP | S58171291 A | 10/1983 |
| JP | 59133890 A | 8/1984 |
| JP | 61062885 | 3/1986 |
| JP | S61157095 A | 7/1986 |
| JP | 63135814 A | 6/1988 |
| JP | H0357911 A | 3/1991 |
| JP | H04115108 A | 4/1992 |
| JP | 04225188 | 8/1992 |

(56) References Cited

FOREIGN PATENT DOCUMENTS

| | | |
|---|---|---|
| JP | H04267214 A | 9/1992 |
| JP | H0572477 A | 3/1993 |
| JP | 06313710 | 11/1994 |
| JP | 1994313710 A | 11/1994 |
| JP | 06331733 | 12/1994 |
| JP | 06341838 | 12/1994 |
| JP | 074950 A | 1/1995 |
| JP | 07128051 A | 5/1995 |
| JP | 7210586 A | 8/1995 |
| JP | H07229963 A | 8/1995 |
| JP | 0821714 A | 1/1996 |
| JP | H0815413 A | 1/1996 |
| JP | H08129145 A | 5/1996 |
| JP | H08136849 A | 5/1996 |
| JP | H08262140 A | 10/1996 |
| JP | 09021868 | 1/1997 |
| JP | 1123993 A | 1/1999 |
| JP | 2001056275 | 8/1999 |
| JP | 2000121724 A | 4/2000 |
| JP | 2000249546 A | 9/2000 |
| JP | 2000339468 A | 12/2000 |
| JP | 2001013001 A | 1/2001 |
| JP | 2001021303 A | 1/2001 |
| JP | 11231047 | 2/2001 |
| JP | 2011066211 A | 3/2001 |
| JP | 2001337278 A | 12/2001 |
| JP | 2003050128 A | 2/2003 |
| JP | 2003156330 A | 5/2003 |
| JP | 2003156562 A | 5/2003 |
| JP | 2003194526 A | 7/2003 |
| JP | 2003202215 A | 7/2003 |
| JP | 2003216255 A | 7/2003 |
| JP | 2003308205 A | 10/2003 |
| JP | 2004109106 A | 4/2004 |
| JP | 2004245832 A | 9/2004 |
| JP | 2004257927 A | 9/2004 |
| JP | 2004348575 A | 12/2004 |
| JP | 2005030937 A | 2/2005 |
| JP | 2005055226 A | 3/2005 |
| JP | 2005069700 A | 3/2005 |
| JP | 2005174887 | 6/2005 |
| JP | 2005517908 | 6/2005 |
| JP | 2005215917 A | 8/2005 |
| JP | 2005257510 A | 9/2005 |
| JP | 2006038683 A | 2/2006 |
| JP | 2006102176 | 4/2006 |
| JP | 2006203404 A | 8/2006 |
| JP | 2006226948 A | 8/2006 |
| JP | 2006241833 A | 9/2006 |
| JP | 2006266821 | 10/2006 |
| JP | 2006301991 A | 11/2006 |
| JP | 2007514943 A | 6/2007 |
| JP | 2007178943 A | 7/2007 |
| JP | 2008076303 A | 4/2008 |
| JP | 2008082707 A | 4/2008 |
| JP | 2008096123 A | 4/2008 |
| JP | 2008107286 A | 5/2008 |
| JP | 2008304220 | 12/2008 |
| JP | 2009063339 A | 3/2009 |
| JP | 2009524057 | 6/2009 |
| JP | 2009541758 A | 11/2009 |
| JP | 2010169405 A | 8/2010 |
| JP | 2013516928 A | 5/2013 |
| JP | 2013517508 A | 5/2013 |
| JP | 2013117417 A | 6/2013 |
| JP | 2013543970 A | 12/2013 |
| WO | 8801924 A1 | 3/1988 |
| WO | 8905512 | 6/1989 |
| WO | 9208568 A1 | 5/1992 |
| WO | 9711399 | 3/1997 |
| WO | 9808050 | 2/1998 |
| WO | 9910706 A1 | 3/1999 |
| WO | 0014474 A1 | 3/2000 |
| WO | 0020880 A2 | 4/2000 |
| WO | 0026612 A1 | 5/2000 |
| WO | 0033149 | 6/2000 |
| WO | 0034733 | 6/2000 |
| WO | 0063645 | 10/2000 |
| WO | 0063681 A2 | 10/2000 |
| WO | 0177613 A1 | 10/2001 |
| WO | 02084327 A2 | 10/2002 |
| WO | 02088855 A1 | 11/2002 |
| WO | 02101323 A2 | 12/2002 |
| WO | 2004096502 A1 | 11/2004 |
| WO | 2005008271 A2 | 1/2005 |
| WO | 2005059473 A2 | 6/2005 |
| WO | 2005072917 A1 | 8/2005 |
| WO | 2005075875 | 8/2005 |
| WO | 2005100908 A1 | 10/2005 |
| WO | 2005103863 | 11/2005 |
| WO | 2006000552 A1 | 1/2006 |
| WO | 2006014445 A1 | 2/2006 |
| WO | 2006051264 A1 | 5/2006 |
| WO | 2006053837 A1 | 5/2006 |
| WO | 2007002319 A1 | 1/2007 |
| WO | 2007012198 A1 | 2/2007 |
| WO | 2007028941 | 3/2007 |
| WO | 2007051972 A1 | 5/2007 |
| WO | 2007087198 A1 | 8/2007 |
| WO | 2007118478 A1 | 10/2007 |
| WO | 2007125081 A1 | 11/2007 |
| WO | 2007144906 A1 | 12/2007 |
| WO | 2008019856 A1 | 2/2008 |
| WO | 2008027588 A2 | 3/2008 |
| WO | 2008047171 | 4/2008 |
| WO | 2008047171 A1 | 4/2008 |
| WO | 2008048424 A2 | 4/2008 |
| WO | 2008052348 A1 | 5/2008 |
| WO | 2008064276 A3 | 5/2008 |
| WO | 2008066896 | 6/2008 |
| WO | 2008068791 A1 | 6/2008 |
| WO | 2008075170 A1 | 6/2008 |
| WO | 2008121073 A1 | 10/2008 |
| WO | 2008157061 A1 | 12/2008 |
| WO | 2009001165 A1 | 12/2008 |
| WO | 2009003225 A1 | 1/2009 |
| WO | 2009016185 A1 | 2/2009 |
| WO | 2009053085 A1 | 4/2009 |
| WO | 2009083452 A1 | 7/2009 |
| WO | 2009095384 A2 | 8/2009 |
| WO | 2009123278 A1 | 10/2009 |
| WO | 2009127526 A1 | 10/2009 |
| WO | 2009130169 A1 | 10/2009 |
| WO | 2009149740 A1 | 12/2009 |
| WO | 2010015086 A1 | 2/2010 |
| WO | 2010040742 A1 | 4/2010 |
| WO | 2010092131 A1 | 8/2010 |
| WO | 2010108089 A2 | 9/2010 |
| WO | 2010108644 A1 | 9/2010 |
| WO | 2010148525 A1 | 12/2010 |
| WO | 2011000435 A1 | 1/2011 |
| WO | 2011000955 A1 | 1/2011 |
| WO | 2011021103 A1 | 2/2011 |
| WO | 2011029140 A1 | 3/2011 |
| WO | 2011057130 A2 | 5/2011 |
| WO | 2011060899 A1 | 5/2011 |
| WO | 2011090829 A2 | 7/2011 |
| WO | 2011090895 A1 | 7/2011 |
| WO | 2012013525 A2 | 2/2012 |
| WO | 2012037157 A2 | 3/2012 |
| WO | 2012038446 A1 | 3/2012 |
| WO | 2012061122 A1 | 5/2012 |
| WO | 2012013525 A2 | 8/2012 |
| WO | 2012112683 A2 | 8/2012 |
| WO | 2012125671 A1 | 9/2012 |
| WO | 2012168322 A2 | 12/2012 |
| WO | 2013112455 A1 | 8/2013 |
| WO | 2013184340 A1 | 12/2013 |
| WO | 2013186160 A1 | 12/2013 |
| WO | 2013188026 A1 | 12/2013 |
| WO | 2013190031 A1 | 12/2013 |
| WO | 2014128498 A2 | 8/2014 |

(56) References Cited

OTHER PUBLICATIONS

Elstrom, M.D., Stereo-Based Registration of LADAR and Color Imagery, Part of SPIE Conference on Intelligent Robots and Computer Vision XVII: Algorithms, Techniques, and Active Vision, Boston, MA, Nov. 1998, SPIE vol. 3522, 0277-786X/98; [Retrieved on-line], Downloaded From: http://proceedings.spiedigitallibrary.org/on Jan. 26, 2013.
International Search Report for International Application No. PCT/EP2006/003010 mailed Nov. 12, 2006.
Chinese Notification of First Office Action for Chinese Application No. 201080003463.3; Issued Oct. 30, 2012 (translated).
Japanese Office Action for JP Application No. 2012-521117, issued Mar. 25, 2014, including cited references.
Japanese Office Action for JP Application No. 2012-525222, issued Apr. 2, 1014, including cited references.
First Chinese Office Action for Chinese Patent Applicaiton No. 2013082200801190; Dated Aug. 27, 2013.
Japanese Office Action for Japanese Patent Application No. 2012501176; Dated Aug. 27, 2013.
Japanese Office Action for Japanese Patent Application No. 2012-534588; Date of Mailing Sep. 17, 2013.
Merriam-Webster (m-w.com), "Interface". 2012. http://www.merriam-webster.com/dictionary/interface.
Merriam-Webster (m-w.com), "Traverse". 2012. http://www.merriam-webster.com/dictionary/traverse.
Merriam-Webster (m-w.com), "Parts". 2012. http://www.merriam-webster.com/dictionary/parts.
International Search Report of the International Searching Authority for Application No. PCT/US2012/075178; Date of Mailing Apr. 9, 2013.
"Scanner Basis Configuration for Riegl VQ-250", Riegl Company Webpage, Feb. 16, 2011 (Feb. 16, 2011), XP002693900, Retrieved from the internet: URL:http://www.riegl.com/uploads/tx_pxpriegldownloads/30_SystemConfiguration_VQ-250_02-11_16-02-2011.pdf [retrieved on Mar. 15, 2013] the whole document.
Written Opinion of the International Searching Authority for Application No. PCT/US2012/075178; Date of Mailing Apr. 9, 2013.
Chinese Office Action for Chinese Application Serial No. 201080047516-1; Date of Issue Apr. 1, 2013.
Germany Office Action for DE Application No. 10 2012 107 544.1; Issued Jan. 2, 2013.
International Search Report of the International Searching Authority for Application No. PCT/EP2011/003262; Date of Mailing Sep. 30, 2011.
Yk Cho, et al. "Light-weight 3D LADAR System for Construction Robotic Operations" (pp. 237-244); 26th International Symposium on Automation and Robotics in Construction (ISARC 2009), Jun. 24, 2009. 8 Pages.
ABB Flexibile Automation AB: "Product Manual IRB 6400R M99, On-line Manual"; Sep. 13, 2006; XP00002657684; [Retrieved on Sep. 28, 2011 (Sep. 28, 2011)]. Retrieved from the Internet: (See URL Below) 481 Pages.
Anonymous: So wird's gemacht: Mit T-DSL and Windows XP Home Edition gemeinsam ins Internet (Teil 3) Internet Citation, Jul. 2003 (Jul. 2003), XP002364586, Retrieved from Internet: URL:http://support.microsfot.com/ kb/814538/DE/ [retrieved on Jan. 26, 2006]eh.
Cho, et al., Implementation of a Precision Time Protocol over Low Rate Wireless Personal Area Networks, IEEE, 2008, 8 Pages.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story—BNP_GUID_9-5-2006_A_10000000000 . . .[Retreived May 5, 2015] 6 Pages.

Electro-Optical Information Systems, "The Handy Handheld Digitizer" [online], [retrieved on Nov. 29, 2011], http://vidibotics.com/htm/handy.htm. 2 Pages.
EO Edmund Optics "Silicon Detectors" (5 pages) 2013 Edmund Optics, Inc. http://www.edmundoptics.com/electro-optics/detector-components/silicon-detectors/1305[Oct. 15, 2013 10:14:53 Am].
FARO Product Catalog; Faro Arm; 68 pages; Faro Technologies Inc. 2009; printed Aug. 3, 2009.
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentltemld=4209746, [Retreived Oct. 21, 2010] 6 Pages.
Gebre, et al. "Remotely Operated and Autonomous Mapping System (ROAMS)." Technologies for Practical Robot Applications, 2009. Tepra 2009. IEEE International Conference on IEEE, Piscataway, NJ, USA. Nov. 9, 2009, pp. 173-178.
Ghost 3D Systems, Authorized MicroScribe Solutions, FAQs—MicroScribe 3D Laser, MicroScan Tools, & related info, [online], [retrieved Nov. 29, 2011], http://www.gomeasure3d.com/baces100.html. 3 Pages.
GoMeasure3D—Your source for all things measurement, Baces 3D 100 Series Portable CMM from GoMeasure3D, [online], [retrieved Nov. 29, 2011], http://www.gomeasure3d.com/baces100.html. 3 Pages.
Hart, A., "Kinematic Coupling Interchangeability", Precision Engineering, vol. 28, No. 1, Jan. 1, 2004, pp. 1-15, XP55005507, ISSN: 0141-6359, DOI: 10.1016/S0141-6359(03)00071-0.
HYDROpro Navigation, Hydropgraphic Survey Software, Trimble, www.trimble.com, Copyright 1997-2003. 2 Pages.
Information onElectro-Optical Information Systems; EOIS 3D Mini-Moire C.M.M. Sensor for Non-Contact Measuring & Surface Mapping; Direct Dimensions, Jun. 1995. 1 Page.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html. 3 Pages.
J.Geng "Structured-Light 3D Surface Imaging: A Tutorial," Advances in Optics and Photonics 3; Mar. 31, 2011, pp. 128-160; IEEE Intelligent Transportation System Society; 2011 Optical Society of America.
Jasperneite, et al., Enhancements to the Time Synchronization Standard IEEE-1588 for a System of Cascaded Bridges, IEEE, 2004. 6 Pages.
Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (Feb. 9, 20.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html. 2 Pages.
Laser Reverse Engineering with Microscribe, [online], [retrieved Nov. 29, 2011], http://www.youtube.com/watch? v=8VRz_2aEJ4E&feature=PlayList&p=F63ABF74F30DC81B&playnext=1&playnext_from=PL&index=1. 2 Pages.
Leica TPS800 Performance Series—Equipment List, 2004. 4 Pages.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
MicroScan 3D User Guide, RSI GmbH, 3D Systems & Software, Oberursel, Germany, email: info@rsi-gmbh.de, Copyright RSI Roland Seifert Imaging GmbH 2008. 58 Pages.
Moog Components Group "Technical Brief; Fiber Optic Rotary Joints" Document No. 303 (6 pages) Mar. 2008; MOOG, Inc. 2008 Canada; Focal Technologies.
Moog Components Group; "Fiber Optic Rotary Joints; Product Guide" (4 pages) Dec. 2010; MOOG, Inc. 2010.
P Ben-Tzvi, et al "Extraction of 3D Images Using Pitch-Actuated 2D Laser Range Finder for Robotic Vision" (6 pages) BNSDOCID <XP 31840390A_1_>, Oct. 15, 2010.

(56) References Cited

OTHER PUBLICATIONS

Patrick Willoughby; "Elastically Averaged Precision Alignment"; In: "Doctoral Thesis" ; Jun. 1, 2005; Massachusetts Institute of Technology; XP55005620; Abstract 1.1 Motivation; Chapter 3, Chapter 6, 158 Pages.
Romer "Romer Absolute Arm Maximum Performance Portable Measurement" (Printed Oct. 2010); Hexagon Metrology, Inc. http://us:Romer.com; Hexagon Metrology, Inc 2010. 9 Pages.
Romer Romer Absolute Arm Product Brochure: (2010); Hexagon Metrology; www.hexagonmetrology.com; Hexagon AB, 2010. 24 Pages.
Romer "Romer Measuring Arms Portable CMMs for R&D and shop floor" (Mar. 2009) Hexagon Metrology (16 pages).
RW Boyd "Radiometry and the Detection of Otpical Radiation" (pp. 20-23) 1983 Jon wiley & Sons, Inc.
Sauter, et al., Towards New Hybrid Networks for Industrial Automation, IEEE, 2009. 8 Pages.
Spada, et al., IEEE 1588 Lowers Integration Costs in Continuous Flow Automated Production Lines, XP-002498255, ARC Insights, Insight # 2003-33MD&H, Aug. 20, 2003. 4 Pages.
Surman et al. "An autonomous mobile robot with a 3D laser range finder for 3D exploration and digitalization of indoor enviornments." Robotics and Autonomous Systems vol. 45 No. 3-4, Dec. 31, 2003, pp. 181-198. Amsterdamn, Netherlands.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM]. 4 Pages.
Willoughby, P., "Elastically Averaged Precisoin Alignment", In: "Doctoral Thesis", Jun. 1, 2005, Massachusetts Institute of Technology, XP55005620, abstract 1.1 Motivation, Chapter 3, Chapter 6. 158 Pages.
AKCA, Devrim, Full Automated Registration of Laser Scanner Point Clouds, Institute of Geodesy and Photogrammetry, Swiss Federal Institute of Technology, Zuerich, Switzerland; Published Dec. 2003.
First Office Action and Search Report with English Translation for Chinese Patent Application No. 201080003456.3; Issue Date Jan. 17, 2013.
International Preliminary Report on Patentability for International Application Serial No. PCT/EP2011/003261. International filed Jul. 1, 2011. Date of Issuance Jan. 29, 2013.
International Preliminary Report on Patentability for International Application Serial No. PCT/EP2011/003262. International filed Jul. 1, 2011. Date of Issuance Jan. 29, 2013.
International Preliminary Report on Patentability for International Application Serial No. PCT/EP2011/003263. International filed Jul. 1, 2011. Date of Issuance Jan. 29, 2013.
International Preliminary Report on Patentability for International Application Serial No. PCT/EP2011/003264. International filed Jul. 1, 2011. Date of Issuance Jan. 29, 2013.
Second Office Action with English Translation for Chinese Patent Application No. 201080003466.7; Issue Date Jul. 19, 2013.
German Office Action for DE Application Serial No. 102012109481.0; dated Aug. 1, 2013.
Japanese Office Action for JP Application Serial No. 2013-520990; Date of Mailing Jul. 2, 2013.
GB Examination Report dated Jun. 19, 2013 for GB Application No. GB1202398.2.
GB Examination Report dated Aug. 15, 2013 for GB Application No. GB 1303382.4.
GB Examination Report dated Aug. 7, 2013 for GB Application No. GB1303390.7.
Japanese Office Action for JP Application No. 2012-534589; issued Jul. 30, 2013.
Japanese Office Action for Application Serial No. 2013-520987; Date of Mailing Jul. 2, 2013.
Japanese Office Action for Application Serial No. 2013-520989; Date of Mailing Jul. 2, 2013.
Japanese Office Action for Application Serial No. 2012-534590; Date of Mailing Jul. 30, 2013.
Japanese Office Action for JP Application Serial No. 2012-501175; Date of Mailing Jul. 16, 2013.
Leica Geosystems, FBI Crime Scene Case Study, Cited in Opposition of EP Application No. 07785873.6 in Oral Proceedings held on Jun. 27, 2013, Munchen, Germany; D13, p. 5 of Summons, Tony Grissim, Feb. 2006.
GB Examination Report dated Mar. 27, 2013 for GB Application No. GB1303390.7.
GB Examination Report dated Mar. 27, 2013 for GB Application No. GB1303382.4.
Second German Office Action for DE Application Serial No. 10 2009 015 922.3; Dated Dec. 2, 2013.
German Office Acton for DE Application No. 102013102.554.4; Dated Jan. 9, 2014.
GB Exam and Search Report for Application No. GB1314371.4; Dated Nov. 22, 2013.
Horn, B.K.P., Closed-Form Solution of Absolute Orientation Using Unit Quaternions, J. Opt. Soc. Am. A., vol. 4., No. 4, Apr. 1987, pp. 629-642, ISSN 0740-3232.
Second JP Office Action for JP Patent Application Serial No. 2012-534590; Date of Mailing Nov. 12, 2013.
Japanese Office Action for JP Patent Application Serial No. 2012-501174; Dated Oct. 29, 2013.
WO 00/26612 is the published equivalent of DE 19850118. Published May 11, 2000.
AKCA, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656666.
Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003 (Jul. 2003), pp. 72-77, XP002590306.
Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003. [IEEE/RSJ International Conference on Intelligent Robots and Systems], New York, NY: IEEE, US vol. 1, Oct. 27, 2003; pp. 188-193, XP010672337, DOI:10.1109/IROS.2003.1250626;ISBN 978-0-7803-7860-5, p. 189; Figure 1.
Chinese Office Action Dated Jun. 2, 2010 with English Translation of the Text for Application No. 2006800540959.
Chinese Publication No. CN 1445509, published Oct. 1, 2003— English Abstract Not Available; EP Equivalent 1347267.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998 (Nov. 2, 1998), Nov. 3, 1998 (Nov. 3, 1998) pp. 343-354, XP 002587995, Proceedings of the SPIE.
Godin, G., et al., A Method for the Registration of Attributed Range Images, Copyright 2001, [Retrieved on Jan. 18, 2010 at 03:29 from IEEE Xplore].
International Preliminary Report on Patentability and Written Opinion for International Application No. PCT/EP2007/005789; Date of Mailing Oct. 30, 2007.
International Preliminary Report on Patentability and Written Opinion for PCT/IB2010/002216; Date of Issuance Jan. 24, 2012.
International Preliminary Report on Patentability and Written Opinion for PCT/EP2009/050887; Date of Issue Sep. 7, 2010.
International Preliminary Report on Patentability and Written Opinion for PCT/IB2010/002226; Date of Issuance Jan. 24, 2012.
International Preliminary Report on Patentability and Written Opinion for PCT/EP2004/014605; Date of Issue Aug. 29, 2006.
iQsun Laserscanner Brochure, 2 Pages, Apr. 2005.
International Preliminary Report on Patentability and Written Opinion for PCT/EP2009/050888; Date of Issuance Sep. 7, 2010.
International Search Report and Written Opinion of the International Searching Authority for PCT/EP2009/009174; Date of Mailing May 25, 2010.
International Search Report of the International Searching Authority for PCT/EP2007/005789; Date of Mailing Oct. 30, 2007.

(56) References Cited

OTHER PUBLICATIONS

International Search Report and Written Opinion for International Patent Application PCT/IB2010/002226; mailing date Dec. 13, 2010.
International Search Report of the International Searching Authority for PCT/EP2004/014605; Date of Mailing Apr. 15, 2005.
International Search Report of the International Searching Authority for PCT/EP2010/001779; Date of Mailing Jul. 20, 2010.
International Search Report for International Patent Application PCT/EP2010/001780; mailing date Jul. 23, 2010.
International Search Report of the International Searching Authority for PCT/EP2010/001781; Date of Mailing Jul. 22, 2010.
International Search Report of the International Searching Authority for PCT/IB2010/002258; Date of Mailing Jan. 28, 2011.
International Search Report of the International Searching Authority for PCT/IB2010/002216; Date of Mailing Feb. 3, 2011.
International Search Report of the International Searching Authority for PCT/EP2009/050888; Date of Mailing Sep. 15, 2009.
International Search Report of the International Seraching Authority forPCT/EP2010/006867; Date of Mailing Mar. 18, 2011.
International Search Report of the International Searching Authority for PCT/EP2010/006866; Date of Mailing Mar. 14, 2011.
International Search Report of the International Searching Authority for PCT/EP2010/006868; Date of Mailing Mar. 14, 2011.
International Search Report of the International Searching Authority for PCT/EP2009/050887; Date of Mailing May 14, 2009.
Jasiobedzki, Piotr, "Laser Eye—A New 3D Sensor for Active Vision", SPIE—Sensor Fusion VI, vol. 2059, Sep. 7, 1993 (Sep. 7, 1993), pp. 316-321, XP00262856, Boston, U.S.A., Retrieved from the Internet: URL:http:// scitation.aip.org/getpdf/servlet/GetPDFServlet? filetype=pdf&id=PSISDG002059000-001000316000001&idtype=cvips&doi=10.117/12.150236& prog=normal>[retrieved on Mar. 8, 2011] the whole document.
Umeda, K., et al., Registration of Range and Color Images Using Gradient Constraints and Ran Intensity Images, Proceedings of the 17th International Conference onPatern Recognition (ICPR'04), Copyright 2010 IEEE. [Retrieved online Jan. 28, 2010—IEEE Xplore].
Williams, J.A., et al., Evaluation of a Novel Multiple Point Set Registration Algorithm, Copyright 2000, [Retrieved on Jan. 18, 2010 at 04:10 from IEEE Xplore].
Davidson, A. at al., "MonoSLAM: Real-Time Single Camera Slam", IEEE Transactions on Pattern Analysis and Machine Intelligence, vol, 29, No. 6, Jun. 1, 2007, pp. 1052-1067, XP011179664.
Gebre, Biruk a., et al "Remotely Operated and Autonomous Mapping System (ROAMS)", Technologies for Practical Robot Applications, TEPRA 2009, IEEE International Conference on Nov. 9, 2009, pp. 173-178, XP031570394.
Harrison A. et al., "High Quality 3D Laser Ranging Under General Vehicle Motion", 2008 IEEE International Conference on Robotics and Automation, May 19-23, 2008, pp. 7-12, XP031340123.
May, S. et al, "Robust 3D-Mapping with Time-of-Flight Cameras", Intelligent Robots and Systems, IROS 2009, IEEE/RSJ International Conference on Oct. 10, 2009, pp. 1673-1678, XP031581042.
Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.
Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No, 3-4, Dec. 31, 2003, pp. 181-198.
Yan, R., et al, "3D Point Cloud Map Construction Based on Line Segments with Two Mutually Perpendicular Laser Sensors", 2013 13th International Conference on Control, Automation and Systems (ICCAS 2013), IEEE, Oct. 20, 2013, pp. 1114-1116.
Ye, C. et al., "Characterization of a 2-D Laser Scanner for Mobile Robot Obstacle Negotiation" Proceedings/2002 IEEE International Conference on Robotics and Automation, May 11-15, 2002, Washington, D.C., May 1, 2002, pp. 2512-2518, XP009169742.
14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK.
Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US., vol. 2, May 21, 2001, pp. 2045-2050, XP010550445, DOI: 10.1109/Robot.2001.932908 ISBN: 978-0/7803-6576-6, the whole document.
Ingensand, H., Dr., "Introduction to Geodetic Metrology", "Einfuhrung in die Geodatische Messtechnik", Federal Institute of Technology Zurich, Edition 2004, p. 16.
FARO Laserscanner LS, Presentation Forensic Package, Policeschool of Hessen, Wiesbaden, Germany, Dec. 14, 2005; FARO Technologies, Copyright 2008.
FARO Laser Scanner LS, Recording Reality's Digital Fingerprint, The Measure of Success, Copyright 2005.
Leica Geosystems, FBI Crime Scene Case Study.
Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008.
Howard, et al., "Virtual Environments for Scene of Crime Reconstruction and Analysis", Advanced Interfaces Group, Department of Computer Science, University of Manchester, Manchester, UK, Feb. 28, 2000.
International Preliminary Report on Patentability and Written Opinion for PCT/EP2010/001779; Date of Issuance Sep. 27, 2011.
International Preliminary Report on Patentability and Written Opinion for PCT/1B2010/002258; Date of Issuance Feb. 21, 2012.
International Preliminary Report on Patentability and Written Opinion for PCT/EP2010/006866; Date of Issuance May 22, 2012.
International Preliminary Report on Patentability and Written Opinion for PCT/EP2010/006867; Date of Issuance May 22, 2012.
International Preliminary Report on Patentability and Written Opinion for PCT/EP2010/001780; Date of Issuance Sep. 27, 2011.
International Preliminary Report on Patentability and Written Opinion for PCT/EP2010/001781; Date of Issuance Sep. 27, 2011.
International Preliminary Report on Patentability and Written Opinion for PCT/EP2010/006868; Date of Issuance May 22, 2012.
International Preliminary Report on Patentability and Written Opinion for PCT/EP2009/009174; Date of Issuance Aug. 16, 2011.
International Search Report of the International Searching Authority for Application No. PCT/EP2011/001662; Date of Mailing May 26, 2011.
International Search Report of the International Searching Authority for Application No. PCT/EP2011/003261; Date of Mailing Oct. 17, 2011.
International Search Report of the International Searching Authority for Application No. PCT/EP2011/003263; Date of Mailing Oct. 19, 2011.
International Search Report of the International Searching Authority for Application No. PCT/EP2011/003264; Date of Mailing Oct. 19, 2011.
Leica Geosystems TruStory Forensic Analysis by Albuquerque Police Department, 2006.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [retrieved on Oct. 5, 2011] the whole document.
Langford, et al., "Practical Skills in Forensic Science", Pearson Education Limited, Essex, England, First Published 2005, Forensic Chemistry.
Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.
Se, et al., "Instant Scene Modeler for Crime Scene Reconstruction", MDA, Space Missions, Ontario, Canada, Copyright 2005, IEEE.

(56) References Cited

OTHER PUBLICATIONS

The Scene, Journal of The Association for Crime Scene Reconstruction, Apr.-Jun. 2006, vol. 12, Issue 2.
Written Opinion of the International Searching Authority for Application No. PCT/EP2006/003010; Date of Mailing Dec. 11, 2006.
Written Opinion of the International Searching Authority for Application No. PCT/EP2011/001662; Date of Mailing May 26, 2011.
GB Examination Report for Application No. GB1220971.4 dated May 20, 2014.
Creaform Metrology Solutions, "Handy Scan 3D—The Truly Portable Metrology-Grade 3D Scanners" brochure, 7 pages.
Creaform, "Creaform Releases Completely Re-Engineered Handyscan 3D Portable Scanners", May 5, 2014, 1 page.
Mandy, Yousef B., et al; "Projector Calibration Using Passive Stereo and Triangulation"; International Journal of Future Computer and Communication; vol. 2; No. 5; 385-390; Oct. 2013; 6 pgs.

\* cited by examiner

METHOD FOR OPTICALLY SCANNING AND MEASURING AN ENVIRONMENT

CROSS REFERENCE TO RELATED APPLICATIONS

The present application is a continuation application of U.S. application Ser. No. 13/697,031 filed on Apr. 1, 2011, which is a National Stage Application of PCT Application No. PCT/EP2011/001662, filed on Apr. 1, 2011, which claims the benefit of U.S. Provisional Patent Application No. 61/362,810, filed on Jul. 9, 2010, and of pending German Patent Application No. DE 10 2010 020 952.2, filed on May 10, 2010, and which are hereby incorporated by reference.

BACKGROUND OF THE INVENTION

The invention relates to a method for optically scanning and measuring an environment.

Through use of a known method of this kind, a three-dimensional scan is recorded which is then displayed two-dimensionally. Provided that density and extension of the measurement points are smaller than the pixels of the display, a relatively better visual impression is generated if a gap-filling takes place between the measurement points, i.e., if surfaces are generated from the single measurement points. All measurement points can thus be projected onto one plane and be assigned to single pixels. The intermediate pixels of the plane are then filled, for example, by interpolation.

SUMMARY OF THE INVENTION

According to an embodiment of the present invention, a method, system and computer program product are provided for displaying a plurality of measurement points in three-dimensional space on a two-dimensional plane of a display screen. The method includes projecting the plurality of measurement points onto the two-dimensional plane, the display screen has a plurality of pixels. Each of the measurement points of the plurality of measurement points is assigned to one of the pixels in the plurality of pixels. A depth value is assigned to each of the plurality of pixels that are assigned one of the measurement points of the plurality of measurement points. A first pixel is selected, the first pixel having a first measurement point of the plurality of measurement points assigned to the first pixel, the first pixel having a first depth value assigned to the first pixel. A first side of the first pixel is searched for a second pixel having a second measurement point of the plurality of measurement points assigned to the second pixel, the second pixel having a second depth value assigned to the second pixel. A second side of the first pixel is searched for a third pixel having a third measurement point of the plurality of measurement points assigned to the third pixel, the second side being opposite the first side, the third pixel having a third depth value assigned to the third pixel. It is determined whether the second measurement point and the third measurement point are on a same object plane based at least in part on the second depth value and the third depth value. The first depth value assigned to the first pixel is changed based on determining the second measurement point and the third measurement point are on the same object plane.

BRIEF DESCRIPTION OF THE DRAWINGS

Embodiments of the present invention are explained in more detail below on the basis of exemplary embodiments illustrated in the drawings, in which.

DETAILED DESCRIPTION OF THE INVENTION

Figure 1:
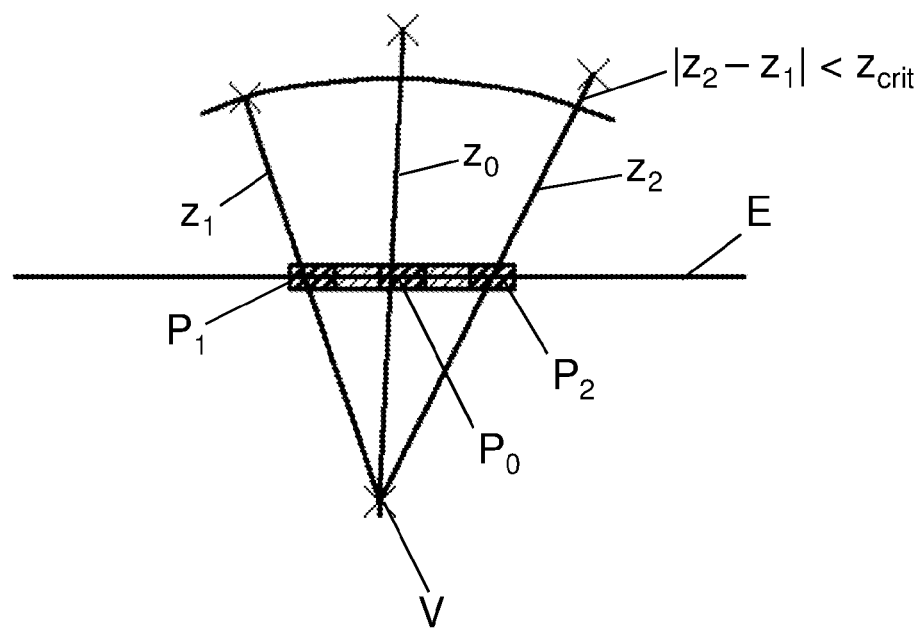
FIG. 1 is a schematic illustration of the assignment and filling of the pixels with a view onto the plane, wherein the adjacent pixels are on the same surface.
Figure 2:
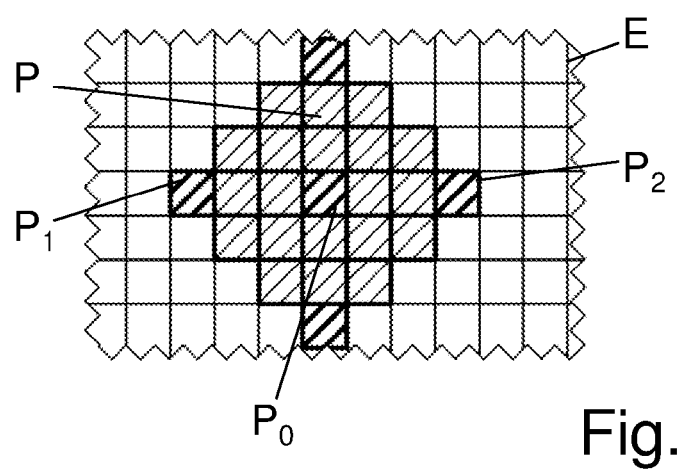
FIG. 2 is a schematic illustration of the assignment and filling of the pixels, according to FIG. 1, with a view onto the plane.
Figure 3:
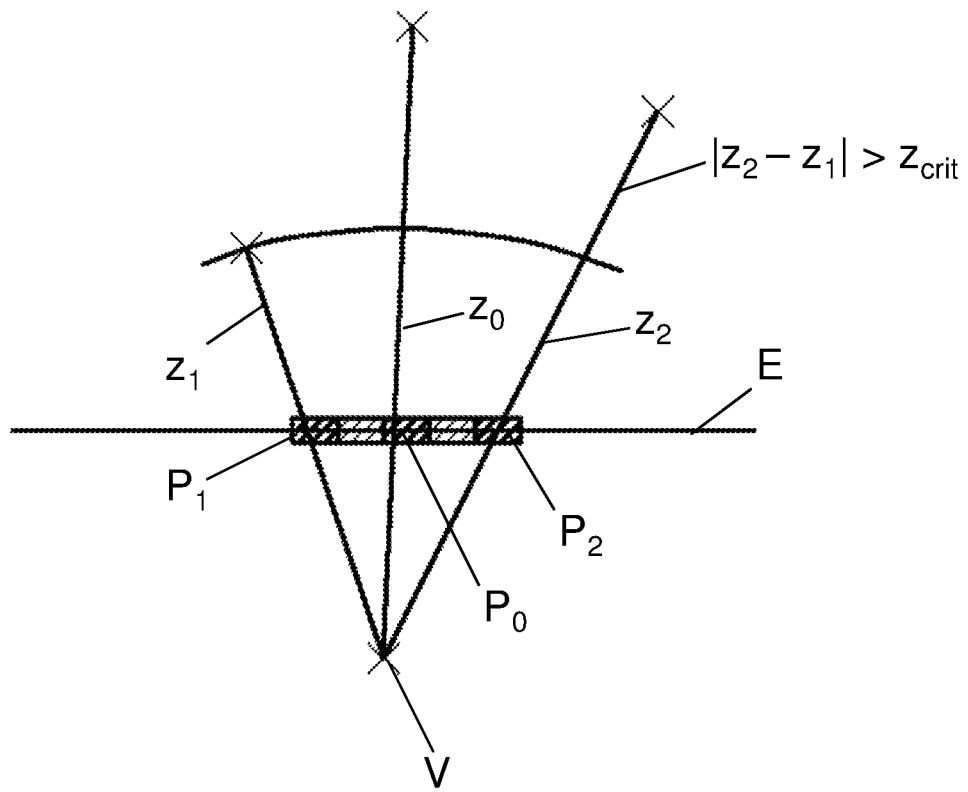
FIG. 3 is a schematic illustration of the assignment and filling of the pixels with a view onto the plane, wherein the adjacent pixels are located on different surfaces.
Figure 4:
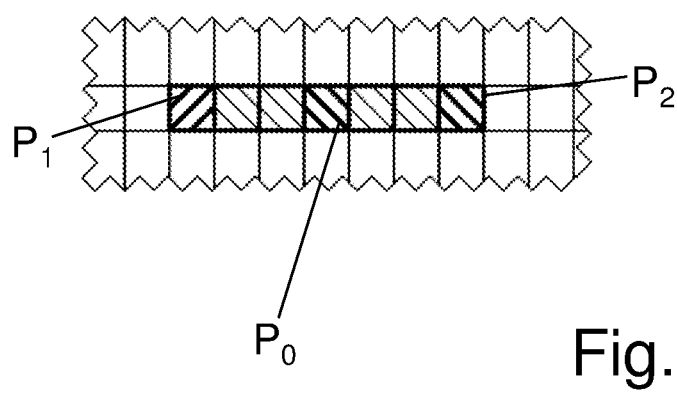
FIG. 4 is a schematic illustration of the assignment and filling of the pixels, according to FIG. 3, with a view onto the plane.

Referring to the Figures, a laser scanner 10 is provided as a device for optically scanning and measuring the environment of the laser scanner 10. The laser scanner 10 has a measuring head 12 and a base 14. The measuring head 12 is mounted on the base 14 as a unit that can be rotated about a vertical axis. The measuring head 12 has a rotary mirror 16 that can be rotated about a horizontal axis. The point of intersection between the two axes of rotation is designated as the center $C_{10}$ of the laser scanner 10.

The measuring head 12 also has a light emitter 17 for emitting an emission light beam 18. The emission light beam 18 may be a laser beam in the range of wave length of approximately 300 to 1600 nm, for example, 790 nm, 905 nm or less than 400 nm, but other electro-magnetic waves having, for example, a greater wave length can be used. The emission light beam 18 is amplitude-modulated with, for example, a sinusoidal or rectangular-waveform modulation signal. The emission light beam 18 is passed from the light emitter 17 onto the rotary mirror 16 where it is deflected and then emitted into the environment. A reception light beam 20, which is reflected by or otherwise scattered from an object O, is captured again by the rotary mirror 16, deflected and passed onto a light receiver 21. The direction of the emission light beam 18 and of the reception light beam 20 results from the angular positions of the rotary mirror 16 and the measuring head 12, which depend on the positions of their respective rotary drives which are, in turn, detected by a respective encoder.

A control and evaluation device 22 has a data link connection to the light emitter 17 and to the light receiver 21 in the measuring head 12, parts thereof being arranged also outside the measuring head 12, for example as a computer connected to the base 14. The control and evaluation device 22 determines, for a multiplicity of measurement points X, the distance d of the laser scanner 10 from the illuminated point on the object O, and from the propagation times of emission light beam 18 and reception light beam 20. For this purpose, the phase shift between the two light beams 18 and 20 can be determined and evaluated.

Through use of the relatively rapid rotation of the mirror 16, scanning takes place along a circular line. Also, through use of the relatively slow rotation of the measuring head 12 relative to the base 14, the entire space is gradually scanned with the circular lines. The totality of the measurement points X of such a measurement shall be designated as a scan. The center $C_{10}$ of the laser scanner 10 defines for such a scan the origin of the local stationary reference system. The base 14 is stationary in this local stationary reference system.

In addition to the distance d to the center $C_{10}$ of the laser scanner 10, each measurement point X comprises a brightness value which may also be determined by the control and evaluation device 22. The brightness is a gray-tone value which is determined, for example, by integration of the bandpass-filtered and amplified signal of the light receiver 21 over a measuring period which is assigned to the measurement point X. Through use of a color camera, it is optionally possible to generate pictures, by which colors (R, G, B) can be assigned as a value to the measurement points X in addition to the brightness or comprising the brightness.

A display device 30 is connected to the control and evaluation device 22. The display device 30 can be integrated into the laser scanner 10, for example into the measuring head 12 or into the base 14, or it can be an external unit, for example part of a computer which is connected to the base 14. The display device 30 has a graphic card 32 and a screen 34 which can be arranged separately from one another or as a structural unit. The control and evaluation device 22 provides 3D data of the scan.

Figure 5:
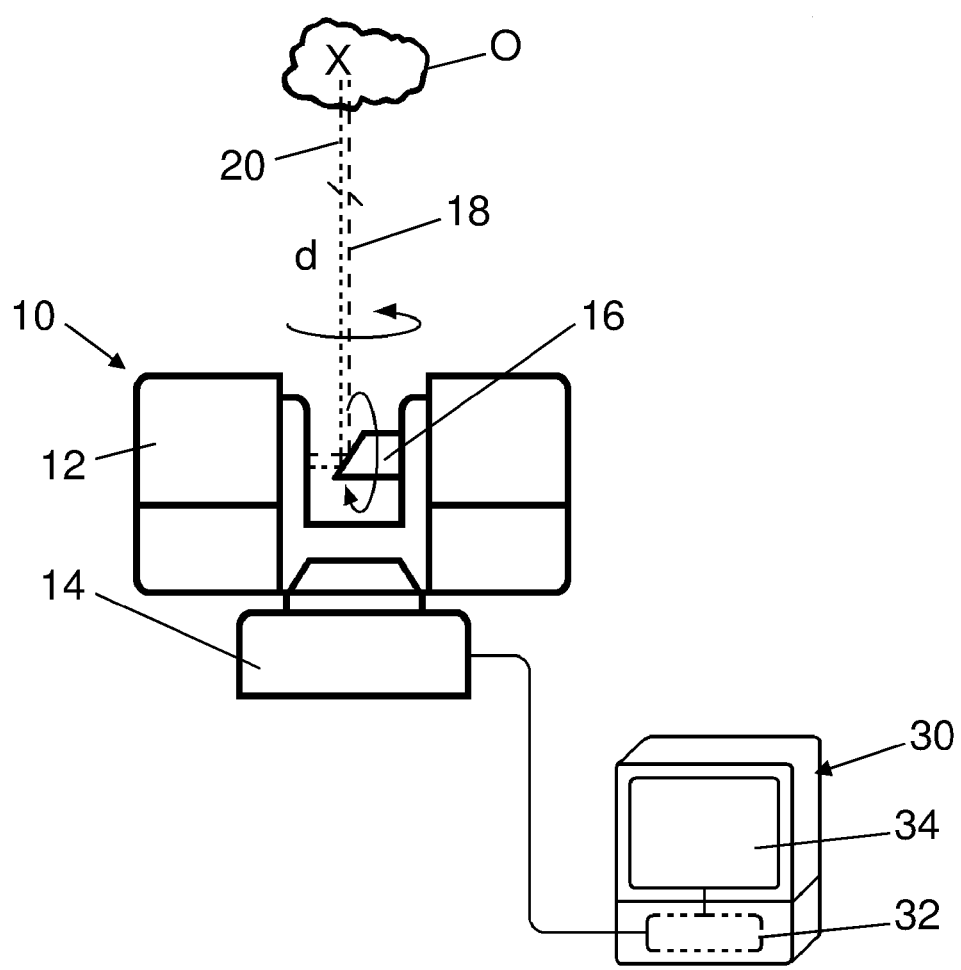
FIG. 5 is a schematic illustration of a laser scanner in the environment including the display device.
Figure 6:
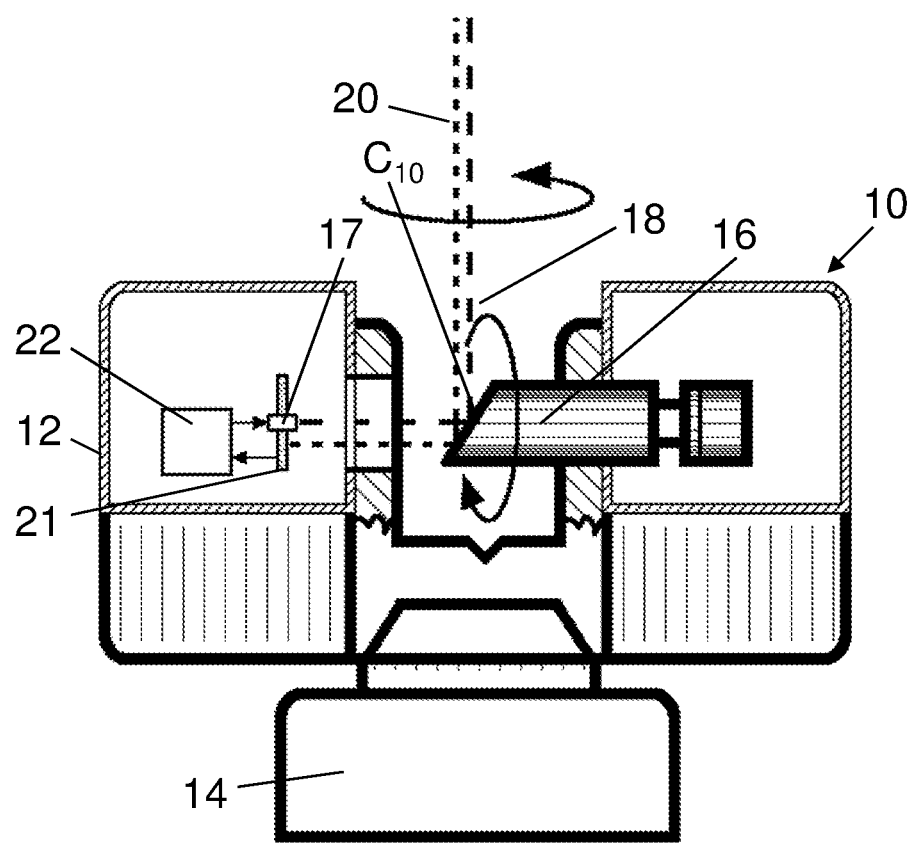
FIG. 6 is a partial sectional illustration of the laser scanner.

Referring also to FIGS. 1-4 as well as FIGS. 5 and 6, the graphic card 32 converts the 3-D data into 2-D data (e.g., rendering data), which are displayed on the screen 34. The 3-D data are the measurement points X, wherein several scans from different positions of the laser scanner 10 can be assembled into one scene. For representing the 2-D data, there are pixels P, i.e., adjacent, small polygonal surfaces (e.g. squares or hexagons), which are arranged in a two-dimensional plane E which corresponds to the screen 34. The starting point is the projection of the measurement points X onto the plane E with a viewer (e.g., eye, camera), at a certain viewpoint V. The projection appears to be in perspective (i.e., the viewpoint V is in the finite) or orthographical (i.e., the viewpoint V in is the infinite). The projected measurement points X are assigned to single pixels P. A Z-buffer serves for representing the 2-D data, i.e., a two-dimensional auxiliary field for the pixels P. In this Z-buffer, a field element (e.g., depth z) is assigned to each pixel P. The depth z of each projected measurement point X corresponds to the distance of the measurement point X to the plane E with respect to the viewpoint V. The field of the pixels P and the Z-buffer may be treated in the same way as the images.

The viewpoint V may be arbitrary per se and is usually changed several times when regarding the scan and/or the scene.

Since the measurement points X are punctiform, with gaps in between, and the pixels P usually, in the case of nearby objects O, have a higher density in the plane E than the projections of the measurement points X, a gap-filling is carried out to fill as many pixels P as possible for an improved representation. The graphic card 32 carries this out in parallel using the 3-D data and the indication of the viewpoint V and of the plane E.

Initially only those pixels P are filled to which the projection of a measurement point X is assigned, i.e., which exactly cover one measurement point X. These pixels P are filled with the value of the assigned measurement point X, i.e., brightness and, where applicable, color. All other pixels P, which do not exactly correspond with a projection of a measurement point X, i.e., which are "in between" are empty at first, for example are set to zero. Each of the depths z, i.e., the field elements of the Z-buffer, which are assigned to the initially filled pixels P, is set to that depth $z_0$, $z_1$, $z_2$, which corresponds to the distance of the assigned measurement point X to the plane E. All other field elements of the Z-buffer (e.g., depths z) are set to an extreme value, for example, to infinite. If, when the projection of the measurement points X is made, it turns out that two measurement points X are available for one pixel P, the measurement point having the smaller depth z is selected and the other one is rejected, so that covered surfaces and covered edges are not visible.

According to embodiments of the present invention, gap-filling takes place in dependence on the depth $z_0$, $z_1$, $z_2$, i.e., on the distance to the plane E. The graphic card 32 selects all pixels P in parallel with respect to time. By way of example, one selected pixel $P_0$ is regarded now. The assigned depth z, i.e., field element of the Z-buffer, contains the depth $z_0$. For each selected pixel $P_0$ the adjacent pixels $P_1$, $P_2$, are searched consecutively, i.e., to the left and to the right and above and below. If the adjacent pixel $P_1$ is not yet filled or if its depth z is bigger than the depth $z_0$ of the selected pixel $P_0$, it is skipped and the second next pixel P is taken as adjacent pixel $P_1$, if necessary iteratively. If an adjacent pixel $P_1$, the depth $z_1$ of which is smaller than the depth $z_0$ of the selected pixel $P_0$, is found in one of the directions, a change to the next direction takes place, and it is looked for the adjacent pixel $P_2$ (e.g., the depth $z_2$ of which is smaller than the depth $z_0$ of the selected pixel $P_0$). It is possible to define a maximum number of skipped pixels, i.e., if the adjacent pixel P or $P_2$ is not yet found after skipping the maximum number of skipped pixels, the search for $P_1$ or $P_2$ is aborted.

If the adjacent pixels $P_1$ and $P_2$ to the selected pixel $P_0$ have been found in opposite directions, with the depths $z_1$ and $z_2$ of the adjacent pixels $P_1$ and $P_2$ being smaller than the depth $z_0$, it is checked whether $P_1$ and $P_2$ are on the same plane, i.e., whether the amount of the difference of $z_2$ and $z_1$ is below a threshold value for the depth $z_{crit}$, i.e., $$|z_2-z_1|<z_{crit}$$

applies. In such a case, the selected pixel $P_0$ is filled with the value which is interpolated between $P_1$ and $P_2$, i.e., brightness and, if applicable color. The assigned field element of the Z-buffer is likewise set to the interpolated depth between $z_1$ and $z_2$. Interpolation depends on the distance of the selected pixel $P_0$ from $P_1$ and $P_2$ in plane E.

If the difference of the depths is too big, i.e., the condition $$|z_2-z_1|>z_{crit}$$

applies, it is assumed that $P_1$ and $P_2$ are located on different planes. The selected pixel $P_0$ is then filled with the value, i.e., brightnesses and, if applicable color, of, for example, the more remote pixel $P_1$ or $P_2$, and the assigned field element of the Z-buffer with the bigger depth $z_1$ or $z_2$. Alternatively, the value and the depth of pixel $P_1$ or $P_2$ having the smaller depth $z_1$ or $z_2$ is transferred. In the case of more than two adjacent pixels $P_1$, $P_2$, the average value of the majority, i.e., of the adjacent pixels $P_1$, $P_2$, which are located on the same surface, can be transferred.

Selected pixels $P_0$, which are already filled with values of the measurement points, are overwritten by the interpolation of the values of the adjacent pixels $P_1$ and $P_2$. Alternatively, a selected pixel $P_0$, which is already filled, remains unvaried.

If pixels P have been skipped when finding the pixels $P_1$ and $P_2$, because they were not filled or because their depth z was too big, their adjacent pixels $P_1$, $P_2$ are the same as with the selected pixel $P_0$, so that the skipped pixels P and the assigned field elements of the Z-buffer, within the framework of the selection taking place in parallel, are likewise filled either with a value which is interpolated between the pixels $P_1$ and $P_2$ and/or the depths $z_1$ and $z_2$ (depending on the distance of the selected pixel $P_0$ from $P_1$ and $P_2$ in plane E) or with the value and/or the depth $z_1$ or $z_2$ of the more remote one among pixels $P_1$ or $P_2$ (or the average value of the majority).

Due to the selection taking place in parallel, filling with the value and/or the depth $z_1$ or $z_2$ of the more remote among the pixels $P_1$ or $P_2$ on account of a difference of depths which is too big, leads to the closer-by pixel $P_1$ or $P_2$ forming an edge. Even if no adjacent pixel $P_1$ or $P_2$ is found, the depth $z_1$ or $z_2$ of which is smaller than the depth $z_0$ of the selected pixel $P_0$, since the selected pixel $P_0$ is at the side of the screen 34, an edge is generated, since these selected pixels $P_0$ at the edge are not filled then.

Gap-filling may take place once again to fill further pixels, i.e., to improve the representation once again.

Gap-filling may take place in the control and evaluation device 22 or by software running on an external computer. Due to the savings in time by a parallel selection, the hardware-based gap-filling on the graphic card 32 may be used together with the programming interface of the latter.

What is claimed is:

1. A method comprising:
   projecting with a processor a plurality of measurement points in three-dimensional space onto a two-dimensional plane of a display screen, the display screen having a plurality of pixels;
   assigning with the processor each of the measurement points of the plurality of measurement points to one of the pixels in the plurality of pixels;
   assigning with the processor a depth value to each of the plurality of pixels that are assigned one of the measurement points of the plurality of measurement points;
   selecting with the processor a first pixel, the first pixel having a first measurement point of the plurality of measurement points assigned to the first pixel, the first pixel having a first depth value assigned to the first pixel;
   searching with the processor to a first side of the first pixel for a second pixel having a second measurement point of the plurality of measurement points assigned to the second pixel, the second pixel having a second depth value assigned to the second pixel;
   searching with the processor to a second side of the first pixel for a third pixel having a third measurement point of the plurality of measurement points assigned to the third pixel, the second side being opposite the first side, the third pixel having a third depth value assigned to the third pixel;
   determining with the processor that the second measurement point and the third measurement point are on a same object plane based at least in part on the second depth value and the third depth value; and
   changing with the processor the first depth value assigned to the first pixel based on determining the second measurement point and the third measurement point are on the same object plane.

2. The method of claim 1, wherein the changing of the first depth value assigned to the first pixel is changed based on an interpolation between the second depth value and the third depth value based on a distance from the first measurement point to the second measurement point and third measurement point.

3. The method of claim 1, wherein the determination that the second measurement point and the third measurement point are on the same object plane is determined based on a difference between the second depth value and the third depth value being less than a predetermined value.

4. The method of claim 3, further comprising:
   determining with the processor the second measurement point and the third measurement point are not on the same object plane based on the difference between the second depth value and the third depth value being greater than or equal to the predetermined value; and
   changing with the processor the first depth value to be equal to the second depth value based on determining the second measurement point and the third measurement point are not on the same object plane, the second depth value being greater than the third depth value.

5. The method of claim 4, further comprising:
   determining with the processor a fourth pixel between the first pixel and the second pixel, the fourth pixel not having one of the measurement points of the plurality of measurement points assigned to the fourth pixel;
   changing with the processor a fourth depth value of the fourth pixel to the second depth value based on the second measurement point and the third measurement point are not on the same object plane; and
   changing with the processor the fourth depth value based on an interpolation between the second depth value and the third depth value based on a distance from the fourth measurement point to the second measurement point and third measurement point based on the second measurement point and the third measurement point being on the same object plane.

6. The method of claim 1, further comprising assigning a brightness value and a color to the first pixel, the second pixel and the third pixel.

7. The method of claim 1, wherein the projection of the plurality of measurement points one the two-dimensional plane is a perspective projection.

8. The method of claim 1, wherein the projection of the plurality of measurement points one the two-dimensional plane is an orthogonal projection.

9. The method of claim 1, wherein the selecting of the first pixel selects all of the pixels in parallel.

10. The method of claim 1, further comprising measuring a first portion of the plurality of measurement points in a first scan at a first position and measuring a second portion of the plurality of measurement points in a second scan at a second position, the first position and second position being in difference locations.

11. A system comprising:
    a memory having computer readable instructions; and
    one or more processors for executing the computer readable instructions, the computer readable instructions comprising:
    projecting with a processor a plurality of measurement points in three-dimensional space onto a two-dimensional plane of a display screen, the display screen having a plurality of pixels;
    assigning with the processor each of the measurement points of the plurality of measurement points to one of the pixels in the plurality of pixels;
    assigning with the processor a depth value to each of the plurality of pixels that are assigned one of the measurement points of the plurality of measurement points;
    selecting with the processor a first pixel, the first pixel having a first measurement point of the plurality of measurement points assigned to the first pixel, the first pixel having a first depth value assigned to the first pixel;

searching with the processor to a first side of the first pixel for a second pixel having a second measurement point of the plurality of measurement points assigned to the second pixel, the second pixel having a second depth value assigned to the second pixel;

searching with the processor to a second side of the first pixel for a third pixel having a third measurement point of the plurality of measurement points assigned to the third pixel, the second side being opposite the first side, the third pixel having a third depth value assigned to the third pixel;

determining with the processor that the second measurement point and the third measurement point are on a same object plane based at least in part on the second depth value and the third depth value; and changing with the processor the first depth value assigned to the first pixel based on determining the second measurement point and the third measurement point are on the same object plane.

12. The system of claim 11, wherein the changing of the first depth value assigned to the first pixel is changed based on an interpolation between the second depth value and the third depth value based on a distance from the first measurement point to the second measurement point and third measurement point.

13. The system of claim 11, wherein the determination that the second measurement point and the third measurement point are on the same object plane is determined based on a difference between the second depth value and the third depth value being less than a predetermined value.

14. The system of claim 13, wherein the computer readable instructions further comprise:

determining with the processor the second measurement point and the third measurement point are not on the same object plane based on the difference between the second depth value and the third depth value being greater than or equal to the predetermined value; and changing with the processor the first depth value to be equal to the second depth value based on determining the second measurement point and the third measurement point are not on the same object plane, the second depth value being greater than the third depth value.

15. The system of claim 14, wherein the computer readable instructions further comprise:

determining with the processor a fourth pixel between the first pixel and the second pixel, the fourth pixel not having one of the measurement points of the plurality of measurement points assigned to the fourth pixel;

changing with the processor a fourth depth value of the fourth pixel to the second depth value based on the second measurement point and the third measurement point are not on the same object plane; and changing with the processor the fourth depth value based on an interpolation between the second depth value and the third depth value based on a distance from the fourth measurement point to the second measurement point and third measurement point based on the second measurement point and the third measurement point being on the same object plane.

16. The system of claim 11, further comprising a device for measuring an environment, the device being configured to measure the plurality of measurement points.

17. The system of claim 16, wherein the device is configured to measure the plurality of measurement points optically.

18. A computer program product for displaying a plurality of measurement points in three-dimensional space on a two-dimensional plane of a display screen, the computer program product comprising a non-transitory computer readable storage medium having program instructions embodied therewith, the program instructions executable by a processor to cause the processor to perform:

projecting with the processor the plurality of measurement points onto the two-dimensional plane of the display screen, the display screen having a plurality of pixels;

assigning with the processor each of the measurement points of the plurality of measurement points to one of the pixels in the plurality of pixels;

assigning with the processor a depth value to each of the plurality of pixels that are assigned one of the measurement points of the plurality of measurement points;

selecting with the processor a first pixel, the first pixel having a first measurement point of the plurality of measurement points assigned to the first pixel, the first pixel having a first depth value assigned to the first pixel;

searching with the processor to a first side of the first pixel for a second pixel having a second measurement point of the plurality of measurement points assigned to the second pixel, the second pixel having a second depth value assigned to the second pixel;

searching with the processor to a second side of the first pixel for a third pixel having a third measurement point of the plurality of measurement points assigned to the third pixel, the second side being opposite the first side, the third pixel having a third depth value assigned to the third pixel;

determining with the processor that the second measurement point and the third measurement point are on a same object plane based at least in part on the second depth value and the third depth value; and changing with the processor the first depth value assigned to the first pixel based on determining the second measurement point and the third measurement point are on the same object plane.

19. The computer program product of claim 18, wherein:

the changing of the first depth value assigned to the first pixel is changed based on an interpolation between the second depth value and the third depth value based on a distance from the first measurement point to the second measurement point and third measurement point; and the determination that the second measurement point and the third measurement point are on the same object plane is determined based on a difference between the second depth value and the third depth value being less than a predetermined value.

20. The computer program product of claim 19 further comprising:

determining with the processor the second measurement point and the third measurement point are not on the same object plane based on the difference between the second depth value and the third depth value being greater than or equal to the predetermined value;

changing with the processor the first depth value to be equal to the second depth value based on determining the second measurement point and the third measurement point are not on the same object plane, the second depth value being greater than the third depth value;

determining with the processor a fourth pixel between the first pixel and the second pixel, the fourth pixel not having one of the measurement points of the plurality of measurement points assigned to the fourth pixel;

changing with the processor a fourth depth value of the fourth pixel to the second depth value based on the second measurement point and the third measurement point are not on the same object plane; and changing with the processor the fourth depth value based on an interpolation between the second depth value and the third depth value based on a distance from the fourth measurement point to the second measurement point and third measurement point based on the second measurement point and the third measurement point being on the same object plane.

\* \* \* \* \*